(12) United States Patent
Yanke et al.

(10) Patent No.: US 12,022,772 B2
(45) Date of Patent: Jul. 2, 2024

(54) AGRICULTURAL HEADER CONTROL

(71) Applicant: DEERE & COMPANY, Moline, IL (US)

(72) Inventors: Bradley K. Yanke, Eldridge, IA (US); Nathan E. Krehbiel, Bettendorf, IA (US); Nathan R. Vandike, Geneseo, IL (US); Matthew T. Wold, Coal Valley, IL (US); Noel W. Anderson, Fargo, ND (US); Duane M. Bomleny, Geneseo, IL (US); Gurmukh H. Advani, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 580 days.

(21) Appl. No.: 17/248,378

(22) Filed: Jan. 22, 2021

(65) Prior Publication Data

US 2022/0232770 A1   Jul. 28, 2022

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC .......................... A01D 41/141; A01D 41/1273
See application file for complete search history.

(56) References Cited

U.S. PATENT DOCUMENTS

| 6,119,442 A  * | 9/2000 | Hale ................... A01D 41/127 56/10.2 H |
| 6,714,662 B1 * | 3/2004 | Benson ..................... G06T 7/70 701/28 |
| 8,820,039 B2 | 9/2014 | Werning |
| 8,915,144 B2 | 12/2014 | Hien |
| 9,807,926 B2 * | 11/2017 | Wilken ............... A01D 43/085 |
| 9,867,334 B2 | 1/2018 | Jongmans et al. |
| 10,049,296 B2 | 8/2018 | Walker |

(Continued)

FOREIGN PATENT DOCUMENTS

| BR | 102020026350 A2 | 7/2022 | |
| CN | 110720302 A * | 1/2020 | ......... A01D 41/1278 |

(Continued)

OTHER PUBLICATIONS

Gary Huitink et al., 8—Corn Harvesting, pp. 65-72, [retrieved on Feb. 6, 2020]. Retrieved from the Internet <URL: https://www.uaex.edu/publications/pdf/mp437/chap8.pdf>.

(Continued)

*Primary Examiner* — Jelani A Smith
*Assistant Examiner* — Jacob Daniel Underbakke

(57) ABSTRACT

Systems and methods for controlling agricultural headers based on crop movement relative to a portion of the agricultural header are disclosed. The presence or movement of crop material, such as a crop material representing grain (e.g., ears, heads, or pods of crops ("EHP")), relative to the harvester header or a portion of the harvester header may be detected, such as by analyzing image data representing one or more images collected over time. Based on a position or movement or both of the crop material relative to the header, one or more parameters of the harvester header may be adjusted, for example, to reduce an amount of grain loss.

22 Claims, 14 Drawing Sheets

(56) References Cited

U.S. PATENT DOCUMENTS

| | | | |
|---|---|---|---|
| 10,255,670 B1* | 4/2019 | Wu | H04N 7/183 |
| 10,636,137 B1* | 4/2020 | Lu | G06T 7/80 |
| 10,813,288 B2* | 10/2020 | Laugen | A01D 57/20 |
| 10,820,518 B2* | 11/2020 | Xu | A01F 12/40 |
| 10,829,033 B1 | 11/2020 | McKinney et al. | |
| 2003/0094403 A1* | 5/2003 | Murata | B07C 5/3425 |
| | | | 209/919 |
| 2014/0050364 A1* | 2/2014 | Brueckner | G06T 7/0004 |
| | | | 382/110 |
| 2014/0230391 A1* | 8/2014 | Hendrickson | G01N 33/0098 |
| | | | 702/2 |
| 2015/0321353 A1* | 11/2015 | McCarty, II | G06T 7/0002 |
| | | | 700/259 |
| 2016/0000008 A1* | 1/2016 | Schøler | A01D 41/1272 |
| | | | 56/10.2 R |
| 2016/0014963 A1* | 1/2016 | Totten | A01D 43/107 |
| | | | 56/208 |
| 2017/0024876 A1* | 1/2017 | Young | G06Q 50/02 |
| 2017/0049045 A1* | 2/2017 | Wilken | A01D 34/008 |
| 2017/0235471 A1* | 8/2017 | Schøler | G01F 1/666 |
| | | | 715/772 |
| 2018/0000011 A1* | 1/2018 | Schleusner | G01S 13/867 |
| 2018/0053067 A1* | 2/2018 | Walker | A01D 41/1273 |
| 2018/0084719 A1* | 3/2018 | Neitemeier | G06T 7/269 |
| 2018/0139898 A1 | 5/2018 | Shearer | |
| 2019/0021226 A1* | 1/2019 | Dima | A01D 34/008 |
| 2019/0150357 A1* | 5/2019 | Wu | H04N 7/188 |
| 2019/0261560 A1* | 8/2019 | Jelenkovic | G06T 7/0004 |
| 2019/0307070 A1* | 10/2019 | Dima | A01D 57/04 |
| 2019/0335661 A1 | 11/2019 | Seiders, Jr. | |
| 2020/0055093 A1* | 2/2020 | Arlinghaus | B07C 5/3425 |
| 2020/0068804 A1* | 3/2020 | Barther | A01D 41/141 |
| 2020/0084966 A1* | 3/2020 | Corban | A01D 61/02 |
| 2020/0100428 A1* | 4/2020 | Anderson | A01D 41/1271 |
| 2020/0236853 A1 | 7/2020 | Trowbridge | |
| 2020/0337240 A1 | 10/2020 | Brimeyer et al. | |
| 2020/0359562 A1 | 11/2020 | Hunt et al. | |
| 2020/0375107 A1 | 12/2020 | Duerksen et al. | |
| 2020/0390035 A1 | 12/2020 | Hunt et al. | |
| 2021/0059117 A1 | 3/2021 | Hunt | |
| 2021/0112713 A1 | 4/2021 | Martin et al. | |
| 2021/0120738 A1 | 4/2021 | Ricketts et al. | |
| 2021/0185877 A1 | 6/2021 | Hunt et al. | |
| 2021/0185879 A1 | 6/2021 | Hunt et al. | |
| 2021/0185880 A1 | 6/2021 | Martin et al. | |
| 2021/0185916 A1 | 6/2021 | Hunt | |
| 2021/0185917 A1 | 6/2021 | Hunt et al. | |
| 2021/0185919 A1 | 6/2021 | Hunt | |
| 2021/0212248 A1 | 7/2021 | Kong et al. | |
| 2021/0212254 A1 | 7/2021 | Thomas et al. | |
| 2021/0235622 A1 | 8/2021 | Baumgarten et al. | |
| 2021/0237982 A1 | 8/2021 | Trowbridge et al. | |
| 2021/0289702 A1 | 9/2021 | Jung et al. | |
| 2021/0289703 A1 | 9/2021 | Hunt et al. | |
| 2021/0307234 A1 | 10/2021 | Jongmans et al. | |
| 2021/0307235 A1 | 10/2021 | Jongmans et al. | |
| 2021/0307248 A1 | 10/2021 | Missotten et al. | |
| 2021/0307249 A1 | 10/2021 | Jongmans et al. | |
| 2021/0329837 A1 | 10/2021 | Schnaider et al. | |
| 2021/0392814 A1 | 12/2021 | Verhoef et al. | |
| 2022/0000023 A1 | 1/2022 | Du et al. | |
| 2022/0000024 A1 | 1/2022 | Zielke et al. | |
| 2022/0053693 A1 | 2/2022 | Gahres et al. | |
| 2022/0061218 A1 | 3/2022 | Karst | |
| 2022/0071093 A1 | 3/2022 | Risius | |
| 2022/0087101 A1 | 3/2022 | Hunt et al. | |
| 2022/0117143 A1 | 4/2022 | Kraus et al. | |
| 2022/0167556 A1 | 6/2022 | Peters | |
| 2022/0183229 A1 | 6/2022 | Hunt | |
| 2022/0225569 A1 | 7/2022 | Zielke et al. | |
| 2022/0232770 A1 | 7/2022 | Yanke et al. | |
| 2022/0240446 A1 | 8/2022 | Martin | |
| 2022/0264798 A1 | 8/2022 | Martin et al. | |
| 2022/0304228 A1 | 9/2022 | Hunt et al. | |
| 2022/0312676 A1 | 10/2022 | Reubens et al. | |
| 2022/0338416 A1 | 10/2022 | Racchella et al. | |
| 2022/0354056 A1 | 11/2022 | Hunt et al. | |
| 2022/0369556 A1 | 11/2022 | Yanke et al. | |
| 2022/0369557 A1 | 11/2022 | Hunt et al. | |
| 2022/0369558 A1 | 11/2022 | Scharmann et al. | |
| 2022/0377978 A1 | 12/2022 | Laugen et al. | |
| 2022/0394927 A1 | 12/2022 | Seiders, Jr. | |
| 2022/0394928 A1 | 12/2022 | Seiders, Jr. | |
| 2022/0400611 A1 | 12/2022 | Missotten et al. | |

FOREIGN PATENT DOCUMENTS

| | | | | |
|---|---|---|---|---|
| CN | 111226603 A | 6/2020 | | |
| CN | 111436276 A | 7/2020 | | |
| CN | 111819993 A | 10/2020 | | |
| CN | 111903317 A | 11/2020 | | |
| CN | 111990062 A | 11/2020 | | |
| CN | 212413857 U | 1/2021 | | |
| CN | 212589003 U | 2/2021 | | |
| CN | 112690089 A | 4/2021 | | |
| CN | 113016358 A | 6/2021 | | |
| CN | 113099836 A | 7/2021 | | |
| CN | 113228939 A | 8/2021 | | |
| CN | 113243194 A | 8/2021 | | |
| CN | 113607096 A | 11/2021 | | |
| CN | 113661827 A | 11/2021 | | |
| CN | 214902224 U | 11/2021 | | |
| CN | 113966667 A | 1/2022 | | |
| CN | 114187353 A | 3/2022 | | |
| CN | 114223386 A | 3/2022 | | |
| CN | 114303621 A | 4/2022 | | |
| CN | 114342665 A | 4/2022 | | |
| CN | 114467504 A | 5/2022 | | |
| CN | 114631426 A | 6/2022 | | |
| CN | 216930906 U | 7/2022 | | |
| CN | 114916306 A | 8/2022 | | |
| CN | 115067062 A | 9/2022 | | |
| DE | 102008032191 A1 * | 1/2010 | | A01D 41/127 |
| DE | 102016202628 A1 | 8/2017 | | |
| DE | 102019214486 A1 * | 4/2020 | | A01D 41/06 |
| EP | 2545761 B1 | 12/2016 | | |
| EP | 3284334 B1 * | 4/2019 | | A01D 41/127 |
| EP | 3284334 B1 | 4/2019 | | |
| EP | 3466238 A1 * | 4/2019 | | A01D 41/1277 |
| IN | 202021036612 A | 4/2022 | | |
| WO | WO-2014093794 A1 * | 6/2014 | | A01D 41/1271 |
| WO | WO-2019234539 A1 * | 12/2019 | | A01D 34/283 |
| WO | WO2020126307 A1 | 6/2020 | | |
| WO | WO21062552 A1 | 4/2021 | | |
| WO | WO21123963 A1 | 6/2021 | | |
| WO | WO21133756 A1 | 7/2021 | | |
| WO | WO21217112 A1 | 10/2021 | | |
| WO | WO21222592 A1 | 11/2021 | | |
| WO | WO21242867 A1 | 12/2021 | | |
| WO | WO22003457 A1 | 1/2022 | | |
| WO | WO22040765 A1 | 3/2022 | | |
| WO | WO22046769 A1 | 3/2022 | | |
| WO | WO22077122 A1 | 4/2022 | | |
| WO | WO22147601 A1 | 7/2022 | | |
| WO | WO22212355 A2 | 10/2022 | | |
| WO | WO22232244 A1 | 11/2022 | | |
| WO | WO23278658 A1 | 1/2023 | | |

OTHER PUBLICATIONS

Dan Anderson et al., 11 Ways to Make Sure Your Header is Doing Its Job, pp. 1-9, [retrieved on Apr. 12, 2020]. Retrieved from the Internet <URL: https://www.porkbusiness.com/news/industry/11-ways-make-sure-your-header-doing-its-job>.

Dave Mowitz et al., Zero Out Corn Head Losses, pp. 1-9, [retrieved on Nov. 17, 2020]. Retrieved from the Internet <URL: https://www.agriculture.com/machinery/harvesting/zero-out-corn-head-losses>.

* cited by examiner

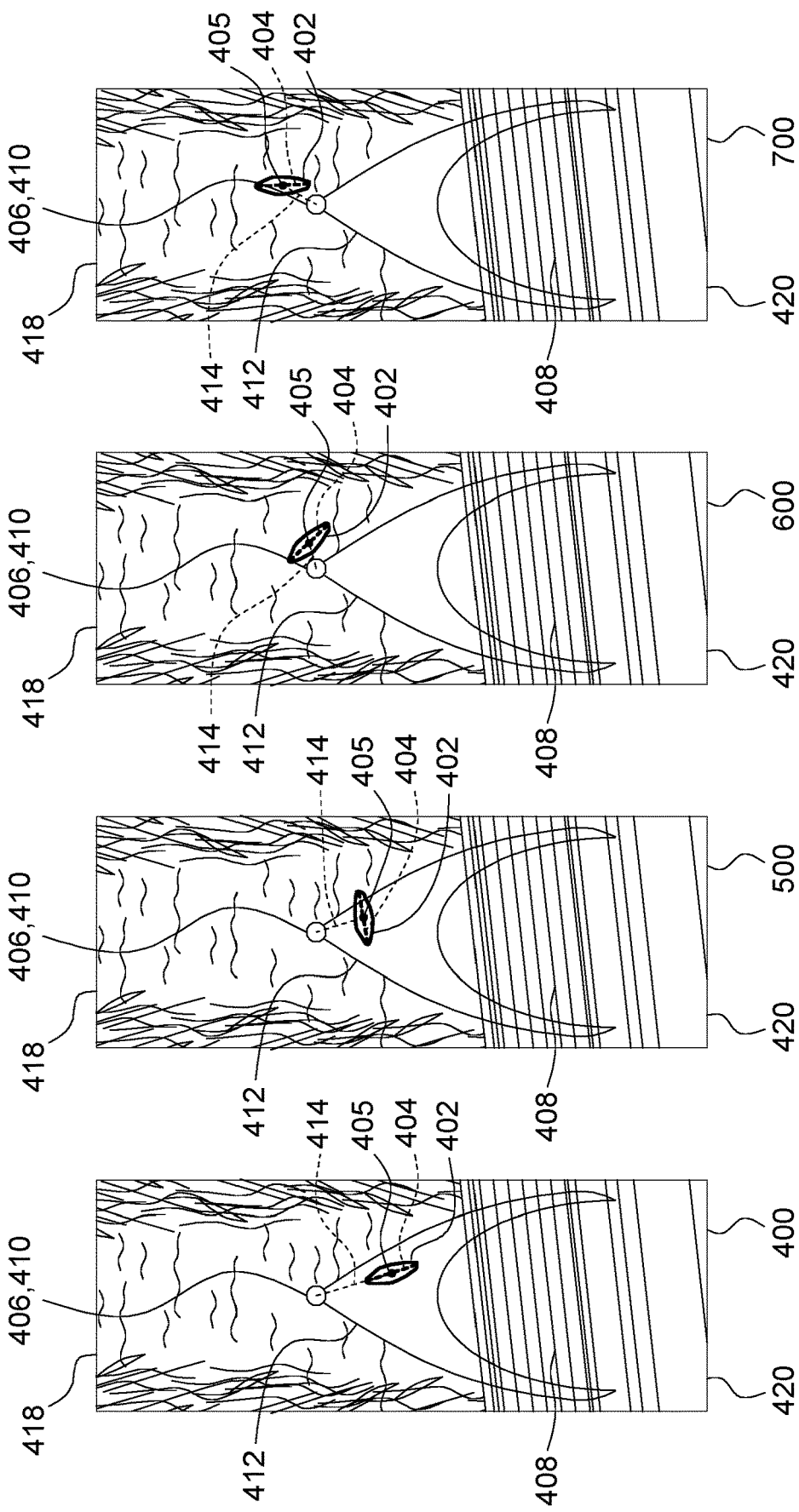

| Image Analysis Results (1502) | Distribution Parameter (1504) |
|---|---|
| Ear, Head, Pod ("EHP") drop ahead of gathering throat region of a row unit (1510) | EHP dropping in defined zone of header |
| Ears wedged on deck plates (1512) | Ears on the deck plates with a selected amount of movement (e.g., a selected rate of movement or a selected amount of displacement) |
| Stalks entering cross auger (1514) | Material other than grain ("MOG") entering combine |
| Unacceptable amount of shelling at deck plates (1516) | Individual kernels detected on header |
| Whole stalks moving into combine (1518) | Whole stalks moving from row unit to cross auger of header |
| Stern vibration (1520) | Stem vibration Pod drop |

FIG. 15B

| Mitigation Action (1506) | Supplemental Harvester Data Utilized (1508) | |
|---|---|---|
| Reduce speed of Agricultural Vehicle | Current speed of the Agricultural Vehicle | 1510 |
| Reduce stalk roll speed<br><br>Adjust front-to-back deck plate gap variation | Current stalk roll speed<br><br>Deck plate gap at front and rear of plates | 1512 |
| Increase stalk roll speed | Current stalk roll speed | 1514 |
| Adjust deck plate gap width<br><br>Adjust roller speed | Current deck plate gap<br>Grain damage<br>Grain loss | 1516 |
| Reduce gathering chain or stalk roll speed | Current gathering chain speed<br>Current stalk roll speed | 1518 |
| Sharpen sickle knives | Hours since last sharpening of sickle knives | 1520 |

AGRICULTURAL HEADER CONTROL

FIELD OF THE DISCLOSURE

The present disclosure relates generally to systems and methods for controlling agricultural headers.

BACKGROUND OF THE DISCLOSURE

Agricultural headers, particularly those used in combination with a combine harvester, are used to sever crops from the ground and direct the severed crop material to a collection location. Severing crops from the ground represents a first step in crop processing ultimately leading to separating grain of the crops from material other than grain ("MOG"). Where headers are used in combination with a combine harvester, the combine performs subsequent processing operation after the header has severed the crop.

SUMMARY OF THE DISCLOSURE

A first aspect of the present disclosure is directed to a computer-implemented method performed by one or more processors for controlling an agricultural header based on movement of crop material at relative to the agricultural header during harvesting. The method may include analyzing one or more images containing at least a portion of the agricultural header to detect crop material present in the one or more images; categorizing the detected crop material detected in the one or more images; generating measured distribution data based on the categorized crop material; and adjusting a setting of the agricultural header using the measured distribution data.

A second aspect of the present disclosure is directed to an apparatus for controlling an agricultural header based on movement of crop material at the agricultural header during harvesting. The apparatus may include one or more processors and a non-transitory computer-readable storage medium coupled to the one or more processors and storing programming instructions for execution by the one or more processors. The programming instructions may instruct the one or more processors to analyze one or more images containing at least a portion of the agricultural header to detect crop material present in the one or more images; categorize the detected crop material detected in the one or more images; generate measured distribution data based on the categorized crop material; compare the measured distribution data with target distribution data; and adjust a setting of the agricultural header when the measured distribution data does not satisfy the target distribution data.

The various aspects may include one or more of the following features. The measured distribution data may be compared with target distribution data. Adjusting a setting of the agricultural header using the measured distribution data may include adjusting the setting of the agricultural header when the measured distribution data does not satisfy the target distribution data. One or more images of an area of a harvester may be generated header during a harvesting operation. Generating a plurality of the one or more images of an area of a harvester header generated during a harvesting operation may include capturing the plurality of one or more images with an image sensor. Analyzing one or more images containing at least a portion of the agricultural header to detect crop material present in the one or more images may include detecting a type of crop material present in the one or more images. Detecting a type of crop material present in the one or more images may include detecting at least one of a crop grain component ("CGC") of a crop being harvested or a material other than grain ("MOG") of the crop being harvested. The measured distribution data may include the detected behavior of the crop material. Whether the detected behavior of the crop material varies from a selected condition by a selected amount may be determined. Adjusting a setting of the agricultural header using the measured distribution data may include adjusting a setting of the agricultural header when the detected behavior of the crop material varies from the selected condition by the selected amount. Analyzing the one or more images containing at least a portion of the agricultural header to detect crop material present in the one or more images may include detecting a behavior of the crop material in the one or more images. Detecting a behavior of the crop material in the one or more images may include determining a trajectory of the detected crop material relative to the agricultural header. Determining a trajectory of the detected crop material relative to the agricultural header may include determining a vector of the crop material relative to the agricultural header. Determining a vector of the crop material relative to the agricultural header may include: identifying a feature of the crop material; identifying a boundary of the harvester header; generating a line from the feature to a location along the boundary; and detecting how the position of the feature changes over time relative to the location along the boundary of the agricultural header based on how a length and position of the line change relative to the location. Analyzing the one or more images containing at least a portion of the agricultural header to detect crop material present in the one or more images may include predicting whether the trajectory represents a loss of the crop material from the header. Whether the loss based on the trajectory exceeds a threshold may be determined. Detecting a behavior of the crop material in the one or more images may include determining a rotation of the crop material. At least a portion of the measured distribution data may be displayed. Analyzing one or more images containing at least a portion of the agricultural header to detect crop material present in the one or more images may include detecting the crop material based on a contrast between a first color associated with the crop material and a second color associated with a surrounding of the crop material.

Other features and aspects will become apparent by consideration of the detailed description and accompanying drawings.

BRIEF DESCRIPTION OF THE DRAWINGS

The detailed description of the drawings refers to the accompanying figures in which:

FIGS. 4 through 7 are a series of example images taken from an image sensor that is directed towards a region above and forward of a header, according to some implementations of the present disclosure.

FIGS. 15B and 15C are left and right sides, respectively, of an example table containing example mitigation actions based on image analysis of crop material and other data used in determining the mitigation actions, according to some implementations of the present disclosure.

DETAILED DESCRIPTION

Figure 1:
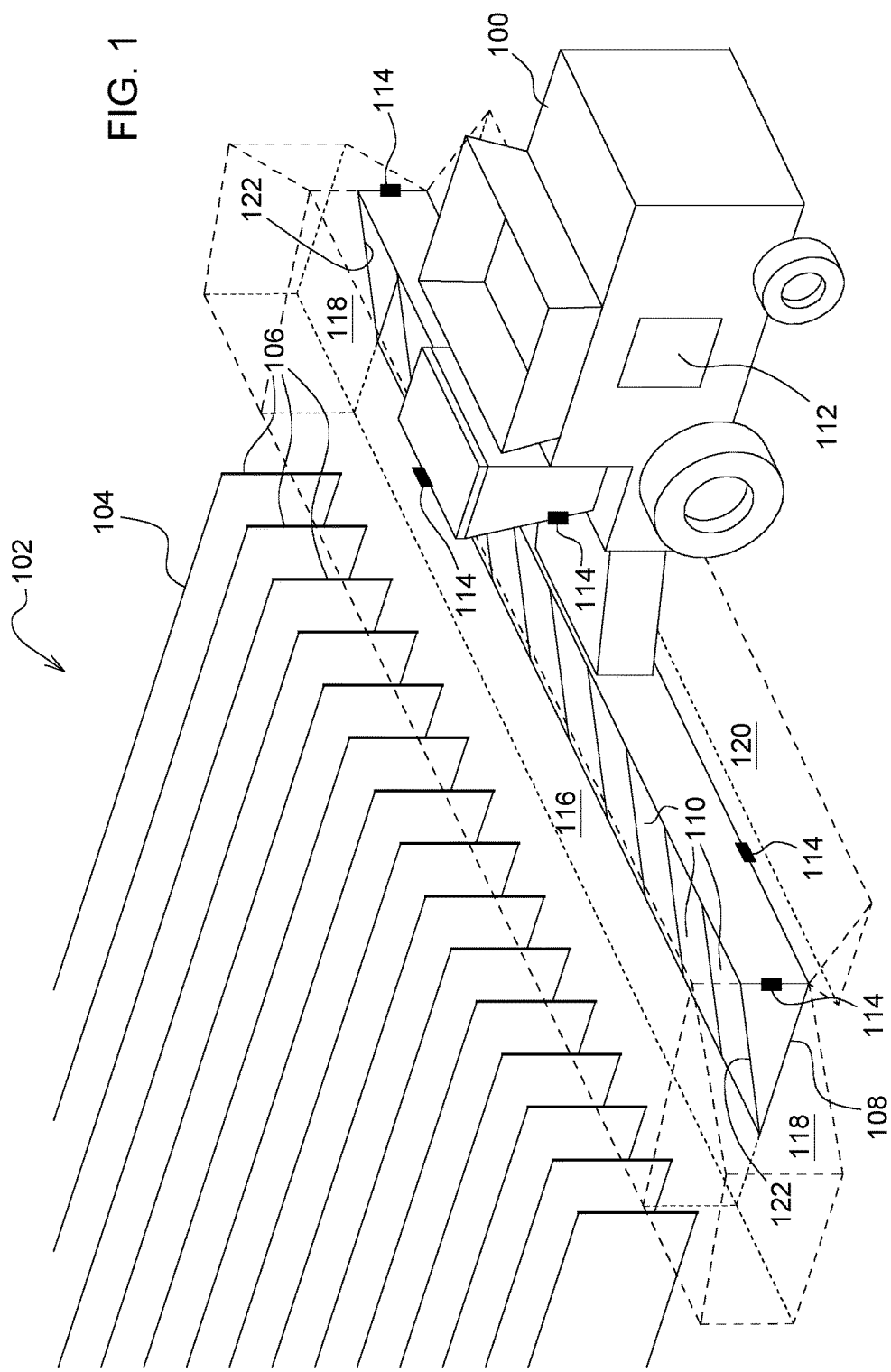
FIG. 1 is a perspective view of an example combine harvester moving through a field and harvesting crops, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to control of an agricultural header based on crop material movement relative to a portion of the header or a position of a type of crop material in relation to a position of another type of crop material at a location proximate to the agricultural header. Particularly, the present disclosure describes detecting the presence or movement of crop material, such as a crop material representing grain (e.g., ears, heads, or pods of crops ("EHP")), relative to the harvester header or a portion of the harvester header. Based on a position or movement or both of the crop material relative to the header, one or more parameters of the harvester header may be adjusted, for example, to reduce an amount of grain loss. The detected crop material and the position thereof relative to the harvester header may be indicative of grain loss or undesirable operation of the agricultural header. Therefore, performing an adjustment to one or more parameters of the header is performed to improve movement of the crop material, e.g., reduce an amount of grain loss and, thus, increase yield of an area being harvested.

FIG. 1 is a perspective view of an example combine harvester 100 moving through a field 102 and harvesting crops 104. In this example, the crops 104 are arranged in a plurality of rows 106. In this example, the crops 104 are corn that are arranged in the plurality of rows 106. However, the scope of the present disclosure encompasses many other types of crops, whether planted in rows or otherwise. The combine harvester 100 includes a corn header 108 that includes a plurality of row units 110, with each row unit 110 aligning with a particular row 106 to harvest the crops contained in that row 106.

Although a combine harvester 100 and corn header 108 are described, the scope of the present disclosure includes other types of agricultural vehicles and other types of headers. For example, the present disclosure encompasses self-propelled forage harvester, windrower traction vehicles, cotton harvesters, or other agricultural vehicles that carry or otherwise transport a header and other types of headers, such as a draper header, to harvest crops. Further, although corn, ears of corn, and kernels of corn are used in the context of the examples described herein, the scope of the present disclosure is not limited to corn. Rather, the scope of the present disclosure encompasses numerous other crop types and the grains associated therewith.

The combine harvester 100 includes a harvester control system 112 to control one or more aspects of the combine harvester 100 during a harvesting operation. In some implementations, the harvester control system 112 is computer-implemented device the receives information, such as in the form of sensor data, analyzes the received data, and controls one or more aspects of the combine harvester 100 in response to the analysis. In the illustrated example, the harvester control system 112 includes one or more sensors 114 that sense the presence of a crop material, such as EHP, relative to the header 108. In some implementations, the region sensors 114 are image sensors that capture images. The combine harvester 100, the corn header 108, or both may include other sensors. For example, in some implementations, the corn header 108 includes impact sensors that detect a force or sound of EHP interacting (e.g., impacting) with the header 108. The sensors 114 encompass sensors operable to detect some portion of the radiation spectrum, such as the visible spectrum, infrared spectrum, or radar spectrum. Thus, the sensor include, for example, an optical sensor (e.g., camera, a stereo camera), an infrared sensor, lidar, or radar. The sensors 114 are interchangeably referred to as region sensors as the sensors 114 capture images of a region, such as a region proximate to a header. Other types of sensors that are operable to obtain images of crop material at locations relative to a header are also encompassed by the present disclosure. Further, different types of image sensors may be used in combination with each other, and each sensor is operable to transmit sensed data to the harvester control system 112 for analysis, as described in more detail later. The sensed data are transmitted over a wired or wireless connection to the harvester control system 112.

As shown in FIG. 1, one or more sensors 114 are positioned on the combine harvester 100 or header 108 to detect crop material, such as EHP or material other than grain ("MOG"), at different regions 116, 118, and 120 relative to the header 108. In the illustrated example, the region 116 is a region defined above and forward of the header 108; regions 118 are regions adjacent to the lateral sides 122 of the header 108; and region 120 is a region below and adjacent to a trailing end of the header 108. The regions 116, 118, and 120 represent 3D spaces adjacent to the header 108. Thus, the region sensors 206 capture images of the spaces represented by regions 116, 118, and 120 around the header 108. Further, the illustrated shapes of the regions 116, 118, and 120 are provided merely as an example, and are not intended to be limited. Thus, in other implementations, the shapes and sizes one or more of the regions 116, 118, and 120 may be different than the example shown in FIG. 1. In some implementations, the harvester control system 112, using the image data obtained by the sensors 114, is operable to detect crop material, such as EHP and MOG, as the crop material is in motion during harvesting. Particularly, using the image data from the sensors 114, the harvester control system 112 is operable to detect crop material as the crop material travels relative to the header 108 during a harvesting operation. For example, in some instances, one or more of the sensors 114 captures images of crop material moving through the row units 110, within a trough of a cross-auger of the corn header 108, or at one or more locations contained within the confines of the corn header 108. The sensed crop material information is used to determine behaviors of the sensed crop material, such as whether the sensed crop material has escaped or is likely to escape collection, resulting in material loss such as material loss onto the ground.

The image data collected by the sensors 114 can be presented in numerous ways. For example, in some implementations, the image data forms a single or a series of images having 2D coordinate systems. In other implementations, the image data are stereo images having a 3D coordinate system. In still other implementations, the image data are lidar point cloud data having a cartesian or spherical coordinate system. Still further, in some cases, the image data are lidar point cloud data that is enhanced with camera pixel color data and includes a 3D coordinate system. In some instances, the image data are radar 3D image data. In still other implementations, the image data may be a combination of these data types or one or more other data types.

Figure 2:
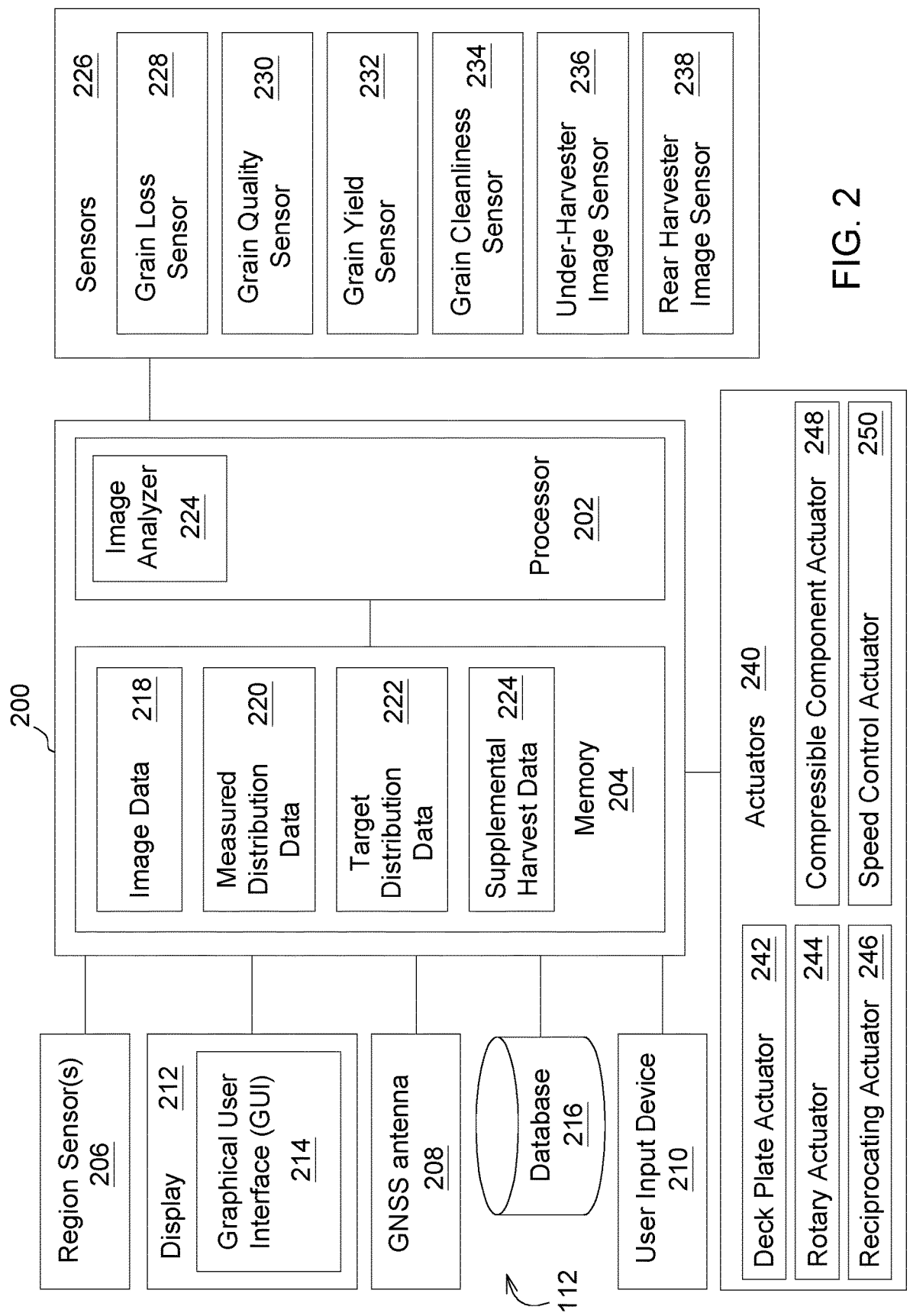
FIG. 2 is a schematic of an example harvester control system, according to some implementations of the present disclosure.

FIG. 2 is a schematic of an example harvester control system 112. In some implementations, the harvester control system 112 is in the form of a computer system, such as the computer system 1700, described in more detail below. Additional details of the harvester control system 112, such as processor 202 and memory 204, are included below in the context of computer system 1700.

As shown, the harvester control system 112 includes a controller 200. The controller 200 includes a processor 202 that is communicatively coupled to a memory 204. The memory 204 communicates with the processor 202 and is used to store programs and other software and information (such as in the form of data). The processor 202 is operable to execute programs and software and receive information from and send information to the memory 204. Although a single memory 204 and a single processor 202 are illustrated, in other implementations, a plurality of memories, processors, or both may be used. Although the processor 202 and the memory 204 are shown as being local components of the controller 200, in other implementations, one or both of the processor 202 and memory 204 may be located remotely.

The harvester control system 112 also includes one or more region sensors 206 (which may be similar to sensors 114) that capture images at one or more regions proximate a header or data representative of material passing through the one or more regions. For example, a region sensor 206 may be located on a header, such as header 108 shown in FIG. 1, or a combine harvester connected to the header, such as combine harvester 100 shown in FIG. 1, in order to capture images of a region relative to the header, such as regions 116, 118, and 120 as also shown in FIG. 1. As explained earlier, region sensors, such as region sensors 114 or 206, include image sensors, such as a camera (e.g., mono camera and stereo camera), radar (such as Doppler radar), lidar, and other devices and technologies operable capture an image or otherwise detect the presence of crop material, such as EHP and MOG, and, particularly, detect crop material in relation to a portion of the header. Image sensors include charge-coupled devices (CCD) and active pixel sensors, such as complementary metal-oxide semiconductor (CMOS) sensors. The data produced by the region sensors 206 are collectively referred to herein as "image data" even though data provided from some sensors within the scope of the region sensors 206, such as radar data and lidar data, may not conventionally be viewed as image data. The image data provide a representation of material, such as crop material, present within a region being sensed at the instant the data were collected. The one or more region sensors 206 are in communication with the controller 200 and transmit the image data to the controller 200.

The harvester control system 112 also includes or is communicably coupled to a global satellite navigation system (GNSS) antenna 208. The GNSS antenna 208 receives geospatial positioning data from a satellite navigation system, such as the Global Positioning System (GPS); BeiDou Navigation Satellite System (BDS); Galileo; GLONASS; Indian Regional Navigation Satellite System (IRNSS); Navigation Indian Constellation (NavIC); and Quasi-Zenith Satellite System (QZSS). The received geospatial positioning data are used, for example, to georeference data received from one or more other sensors, such as the region sensors 206. For example, the georeferenced data are used to georeference image data received from the region sensors 206 so that a location where a particular event represented in the image data occurred is associated with the image data, for example, so that the image data can be mapped. In some instances, the georeferenced data are also used to determine a position of the agricultural vehicle, such as a combine harvester, track a route traveled thereby, or plot a route to be traveled by the agricultural vehicle.

The example header control system 112 also includes or is coupled to a user input device 210. The user input device 210 may be any of keyboard, keypad, joystick, mouse, scanner, camera, microphone, button, knob, or other type of input device that is operable to receive user input. The harvester control system 112 also includes or is coupled to a display 212. The display 212 is operable to display information to a user, such as one or more images received from the region sensors 206. In some implementations, the display 212 also displays data, such a loss data obtained by processing the data received from the region sensors 206. The information displayed on the display 212 may be provided via a graphical user interface (GUI) 214. In some instances, the display 212 is a touch screen display and, in addition to displaying information, also operates as an input device. Information shown in GUI 214 are presented, for example, using text (e.g., numerically), graphics, symbols, colors, patterns, flashing objects or text, or text or objects with varying intensity. However, information may be presented in other ways as well. For example, in some instances, information, such as one or more pieces of information displayed on the GUI 214, may be output as speech. Additional details of GUIs within the scope of the present disclosure are provided below.

The harvester control system 112 also includes or is communicably coupled to a database 216. In some instances, the database 216 is a form of mass storage device, which includes the mass storages devices described below. The database 216 may be located locally, e.g., on the combine harvester or other vehicle containing the harvester control system 112, or may be located remotely. The database 216 stores data for later use, such as by controller 200 and, particularly, by the processor 202 of the controller 200.

The memory 204 stores data, such as image data 218 received from the one or more region sensors 206. As explained earlier, the image data 218 received from the region sensors 206 includes images or other data representing the presence or absence of an object (e.g., crop material) in a particular region, such as regions 116, 118, and 120, described above. The memory 204 also includes a measured component distribution data 220, a target component distribution data 222, and supplemental harvest data 224. In some implementations, the memory 204 also includes other types of data. Examples of supplemental data include yield, grain cleanliness, grain quality, grain loss, grain damage, and component or vehicle operating speeds. Examples uses of supplemental data are described in more detail below. The memory 204 may also include other data, such as current and previous actuator settings and header parameters as well as geospatial positioning data.

The processor 202 executes programs, such as an image analyzer program 224. The controller 200 utilizes data to determine or predict crop material behaviors (e.g., crop losses) on or near the header during harvesting. For example, the controller 200 utilizes the image data 218, the measured distribution data 220, and the target distribution data 222 to determine whether grain losses exceed a selected level of grain loss. As described in greater detail below, in some implementations, the processor 202 of the controller 200 executes the image analyzer program 224, which uses the image data 218 to generate the measured distribution data 220. The measured component distribution data 220 is compared to the target distribution data 222 to determine, for example, whether one or more aspects of crop material on the header satisfies criteria contained in the target distribution data 222 (e.g., whether detected grain loss from the header is at an acceptable level). For example, if the grain loss is above a selected level, the controller 200 generates one or more control signals that are used to actuate one or more actuators of the header. Actuation of one or more header actuators alters header parameters, which, in turn, alters, e.g., reduces, the grain loss level from the header. In some instances, if the determined grain loss is below a selected level, then the current header parameters are maintained.

The example header control system 112 also includes or is communicably coupled to other sensors 226. The other sensors 226 include, for example, a grain loss sensor 228, a grain quality sensor 230, a grain yield sensor 232, a grain cleanliness sensor 234, an under-harvester image sensor 236, and a rear harvester image sensor 238. The grain loss sensor 228 includes plate impact sensors and piezo electric sensors that sense an impact of grain falling from the harvester onto a surface and uses that information to determine grain loss. A grain quality sensor 230 includes, for example, an image sensor that captures one or more images of harvested grain. The one or more images is analyzed to detect a property of harvested grain, such as color or size, to determine grain quality. Grain cleanliness sensors 234 include, for example, an image sensor that captures one or more images of harvested grain, and those images are analyzed to detect MOG or other material present in the harvested grain. The rear harvester sensor 238 includes, for example, an image sensor that captures one or more images of an area adjacent to a trailing end of the harvester. The captured images are analyzed, for example, to detect a quality of residue dispersion as the residue exits a combine harvester or a parameter associated with a windrow formed by the combine harvester.

For example, grain cleanliness and grain quality information provided by grain cleanliness sensor 234 and grain quality sensor 230, respectively, can be influenced by MOG. That is, the presence of MOG in the crop material being sensed by a grain cleanliness sensor 234 or a grain quality sensor 230 affects the data output by these sensors. Thus, these supplemental data output by the grain cleanliness sensors and the grain quality sensors can represent an amount of MOG included in crop material captured by the header. This supplemental data are usable in combination with the image data from the sensors 114 (particularly, where the image data from the sensors 114 are being used to detect and measure MOG) to alter a setting of the header, such as a stalk roll speed or a deck plate spacing of a row unit of a corn header, for example, to alter an amount of MOG retained by the header.

In another example, the data captured by the rear harvester sensor 238 may also be a representation of MOG passing through a combine harvester and, thus, retained by a header. These data are usable with the image data from the sensors 114 to alter a setting of the header, such as stalk roll speed or a deck plate spacing of a row unit of a corn header, for example, to alter an amount of MOG retained by the header.

The harvester control system 112 includes or is communicably coupled to actuators 240. The actuators 240 are associated with a header to alter a state or parameter of the header, or the actuators 240 are associated with a combine harvester or other agricultural vehicle coupled to a header and similarly function to alter a state or parameter of the header. The actuators 240 include a deck plate width actuator 242, a rotary actuator 244, reciprocating actuator 246, compressible component actuator 248, and a speed control actuator 250.

Rotary actuators 244 include, for example, actuators operable to operate stalk rolls (e.g., stalk rolls of a corn head), augers (e.g., cross-augers), stalk choppers, reels (e.g., a reel of a draper header), rotary drums, and belts (e.g., belts of a draper header). Reciprocating actuators 246 include actuators operable to reciprocate a cutter bar of draper header, for example. Compressible component actuators 248 include, for example, pneumatic cylinders or hydraulic accumulators. Compressible components such as pneumatic cylinders or hydraulic accumulators are used as pneumatic springs or dampeners, for example, to control motion of a header or a control transient movement of deck plates of a row unit, such as when the deck plates are moved in response to engagement with incoming crops. The deck plate width actuator 242 alters a spacing between deck plates of a stalk roll assembly of a corn header in response to a signal from the controller 200. The speed control actuator 250 includes actuators operable to control a speed of a component, such as a speed of a rotating component or linear component. Speed control actuators 250 include actuators that alter a speed of a header reel, a conveyor pulley, a stalk roll speed, cutter bar, or another component. Speed control actuator 250 also includes an actuator used to alter a speed of the agricultural vehicle, e.g., combine harvester, through a field in response to a signal from the controller 200. One or more of the speeds may be related. For example, a speed of a combine harvester may be related to a stalk roll speed. If a speed of the stalk rolls is decreased, a speed through the field of the combine harvester may also be decreased in order improve crop material flow through or along the header, for example, to prevent build-up of crop material on the header or decrease intake of MOG. If a speed of travel of the combine harvester through the field decreases, then a speed of the stalk rolls may similarly be decreased. Alternatively, if one of the travel speed of the combine harvester through the field or the stalk roll speed increases, then the other of the speed of the combine harvester or the stalk roll speed may be similarly increased.

Figure 3:
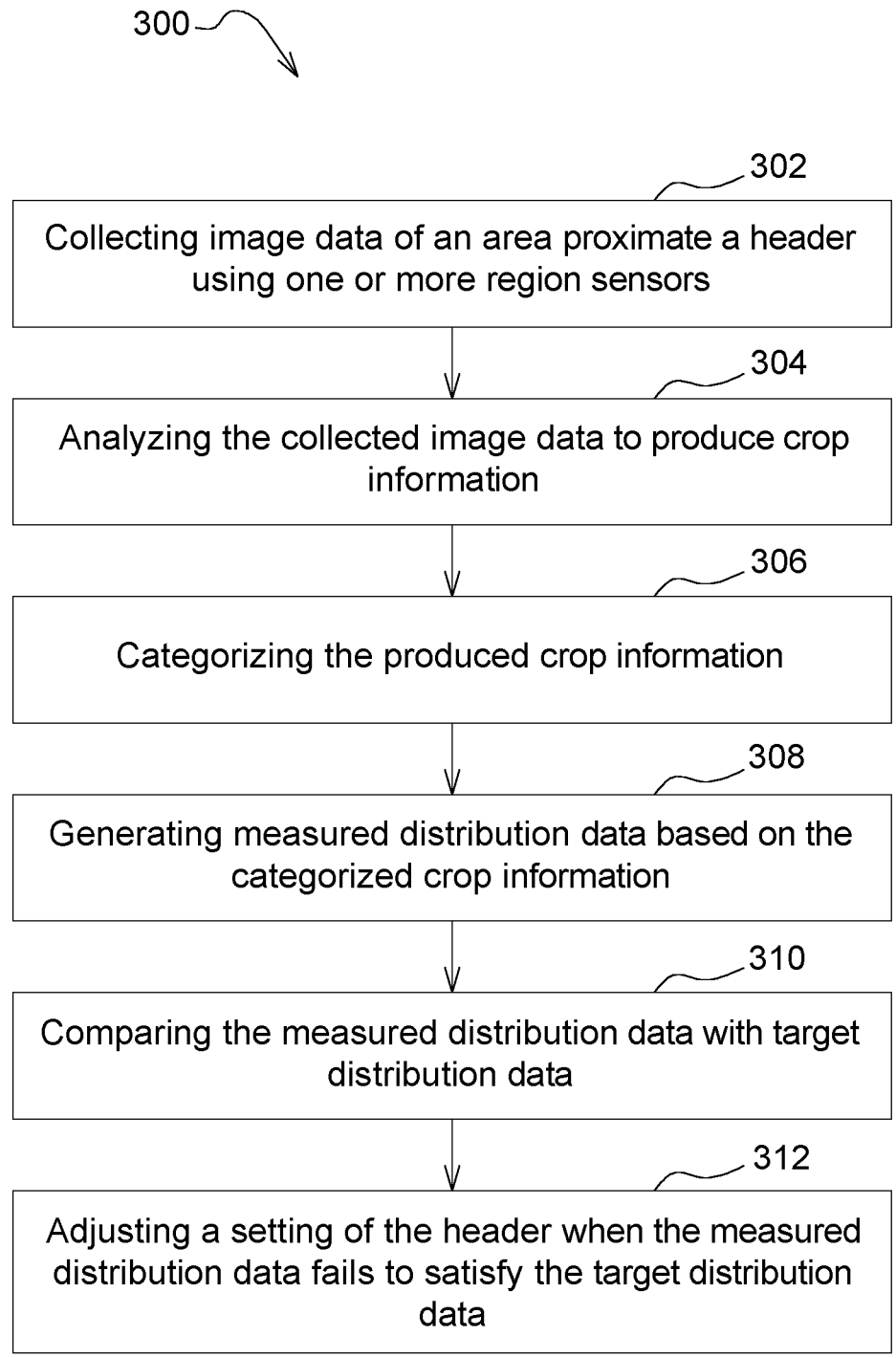
FIG. 3 is a flowchart of an example method of controlling an agricultural header, according to some implementations of the present disclosure.

FIG. 3 is a flowchart of an example method 300 of controlling an agricultural header, such as by altering one or more settings of the header in response to sensed crop material behavior. At 302, image data, such as image data 218, are collected from one or more sensors, such as region sensors 206, that monitor one or more regions proximate the header. In some implementations, other data are collected. For example, other data may be received from one or more other sensors, such as one or more of the sensors 226.

At 304, the image data are analyzed, such as by a harvester controls system 112, to generate crop information associated with crop material present in the image data. The crop information includes, for example, types of detected crop material and behavior of the crop material present within the image data.

FIGS. 4 through 7 are a series of images 400, 500, 600, and 700, respectively, taken from a region sensor that is directed towards a region above and forward of a header 402. The series of images are consecutive images arranged in time order, i.e., from the earliest time shown in FIG. 4 to the latest time shown in FIG. 7. The images 400 through 700 are received by a controller of a harvester control system, such as controller 200, and an image analyzer, such as image analyzer 224, running on a processor of the controller, such as processor 202, analyzes the images. The image analyzer performs image analysis to identify crop material, such as EHP, MOG, or grains. Grains are individual seeds that, in the aggregate, form an EHP. Particularly, the image analyzer identifies and tracks EHPs, partial EHPs, and grains (hereinafter referred to as "crop grain component" ("CGC") present in the collected images and generates metrics related to performance of the header and particularly to grain loss performance of the header. CGC is intended to encompass cotton bolls, for example, and other portions of crop for which harvest is intended to capture.

Example metrics generated by the image analyzer include metrics classifying the crop material. For example, in some implementations, the image analyzer identifies individual grains, ears of corn, broken ears of corn, pods, heads, or MOG. The image analyzer uses image analysis techniques to identify the crop material. For example, the image analyzer may use one or more of the following image analysis techniques: two-dimensional (2D) object recognition, three-dimensional (3D) object recognition, image segmentation, motion detection (e.g., single particle tracking), video tracking, optical flow, 3D pose estimation, pattern recognition, and object recognition, to name a few. These example image analysis techniques are not exclusive. Thus, other types of image analysis techniques may be employed to detect the presence of crop material within an image and movement of the crop material between images. Further, in some implementations, classification approaches using machine learning algorithms are also used to identify features, such as different types of crop material or features of a header, and movement of detected objects between images. Example machine learning algorithms include, but are not limited to, supervised learning algorithms, unsupervised learning algorithms, semi-supervised learning algorithms, and reinforcement learning algorithms.

In some implementations, neural networks, including neural networks using deep learning, may also be used to identify and classify crop material present in the image data. Example neural networks include perception neural networks, Feed-forward neural networks, convolutional neural networks, recurrent neural networks, and autoencoders, to name only a few. Other types of neural networks are also within the scope of the present disclosure.

Figure 18:
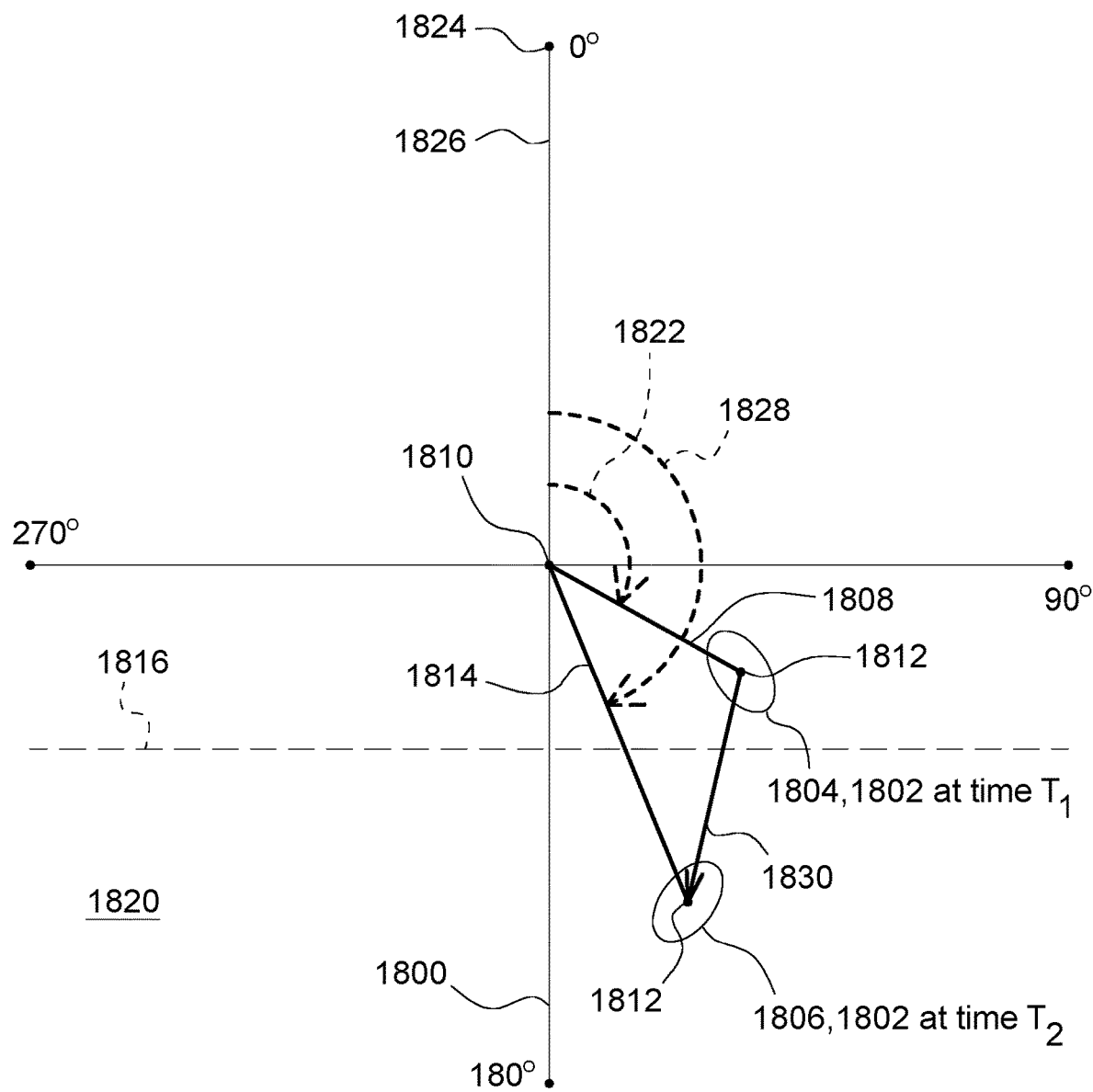
FIG. 18 is an overlay of images showing movement of an ear of corn from a first time $T_1$ and a second time $T_2$, according to some implementations of the present disclosure.

Additionally, the image analyzer identifies a location of the identified crop material within the images. For example, the image analyzer is operable to detect whether the identified crop material is attached to a crop plant; located on a surface, such as a surface of a header; in the air; or on the ground. Further, the image analyzer is operable to determine whether the crop material was present on the ground prior to harvesting or traveled to the ground as a result of harvesting. This functionality is described in greater detail below. The image analyzer also determines a position (e.g., position vector), movement (e.g., a movement vector), or both of the crop material within an image, between multiple images, or a combination thereof. A movement vector (an example of which is shown in FIG. 18) encompasses a speed and direction of movement and is determinable, for example, within an image using, for example, motion blur of an object; between multiple images using, for example, a change in position between images; or using a combination of these techniques.

Returning to FIGS. 4 through 7, the image analyzer has identified a type of crop material. Here, the image analyzer has identified an ear of corn 402. The crop material is identified using one or more characteristics, such as size, shape, color, pattern, or other characteristics associated with a particular type of crop material. Here, the ear of corn 402 may be identified by the image analyzer based on an elongated shape of an ear of corn, a color (e.g., a yellow color) of an ear of corn, a pattern associated with an ear of corn, a combination of these, or based on other criteria. Thus, in some implementations, other types of crop material characteristics using other types of image analysis techniques are usable to detect crop material types, e.g., CGC or MOG. Still further, in other implementations, the image analyzer may have a characteristic or a set of characteristics that are used to identify other types of crop material present in the same images. For example, the image analyzer may have a set of characteristics programmed that are used to identify single grains present within an image. Those identified grains may be indicated or accentuated in the images in a manner that is different from the ears of corn present in the images. Thus, the image analyzer is operable to identify different types of crop material present in images and mark those different types of crop materials in different ways to distinguish one crop material type from another. Particularly, in some implementations, the image analyzer is operable to detect different types of crop material and detect whether the identified crop material is collected by the header or lost to the ground, as described in greater detail below.

Returning to the present example, with the ear of corn 402 identified, the image analyzer is operable to determine characteristics of the ear of corn 402. For example, in some implementations, the image analyzer identifies one or more of a size, a shape, a feature (e.g., a centroid), a center of mass, a major axis, a minor axis, or other characteristics of the ear of corn 402. For example, in the illustrated example, the image analyzer determines a size of the ear of corn 402 (e.g., a length and width), a centroid of the ear of corn 402, a major axis of the ear of corn 402 (e.g., a line extending along the length of the ear of corn 402), and a minor axis of the ear of corn 402 (e.g., a line extending along the width of the ear of corn 402). The major axis, the minor axis, or both may pass through the centroid in some instances. In other implementations, other characteristics, either in addition to or to the exclusion of other characteristics, may be used. Further, although a centroid of the ear of corn 402 is described, in other implementations, one or more other features of crop material, such as CGC, is identified. In some implementations, the identified feature or features are used to define a reference mark. The reference mark may be used in a manner similar to that of a major axis, such as to identify a rotation of an ear of corn or other crop material, as described in more detail below. Examples in the present disclosure describe the use of a major axis to detect rotation. However, the major axis is used only as an example for the purposes of illustration. Thus, other reference marks may be identified or defined and used to detect rotation or other attributes of crop material, such as CGC.

As shown in FIGS. 4 through 7, the image analyzer, another application, or device generates a line 404 representing the major axis of the ear of corn 402. In this example, the major axis line 404 extends through a centroid 405 of the ear of corn 402, although the centroid is not visually identified with a marker. In the illustrated example, the major axis line 404 corresponds to a longitudinal axis of the ear of corn 402. The image analyzer also identifies a reference location 406 corresponding to a part or feature of the header 408. In this example, the reference location 406 is a static location corresponding to a discernable feature, such as a tip 410 of a row unit cover 412 of the header 408. In other implementations, other features of the header 408 may be used as the location 406. In this example, the reference location 406 is presented on a display, such as display 212, with a circular shape. Other marker types may be used to identify the reference location 406 in a presented image. Example markers include markers having different shapes, colors, patterns, symbols, and characters. In some instances, text or objects are used as a marker type to identify the reference location 406 on a display and, still further, text or objects with varying intensity are used as a marker type to identify the reference location 406 on a display.

The image analyzer generates a position vector line 414 that extends from the reference location 406 to the centroid 405 of the ear of corn 402. The position vector line 414 is used to determine how the ear of corn 402 is moving between the series of images of FIGS. 4 through 7. The position vector line 414 is used in combination with a coordinate system 800 shown in FIG. 8. The illustrated coordinate system 800 is provided merely as an example. Thus, other coordinate systems, including radial coordinate systems, spherical coordinate systems, cylindrical coordinate systems, and cartesian coordinates systems, are within the scope of the present disclosure. Further, the described orientation of the coordinate system 800 is also provided merely as an example. Other coordinate system orientations may also be used and are within the scope of the present disclosure. Further, although the coordinate system 800 is illustrated as a 2D coordinate system, the scope of the present disclosure also encompasses the use of a 3D coordinate system to define a position and movement of an object in and across images.

Figure 8:
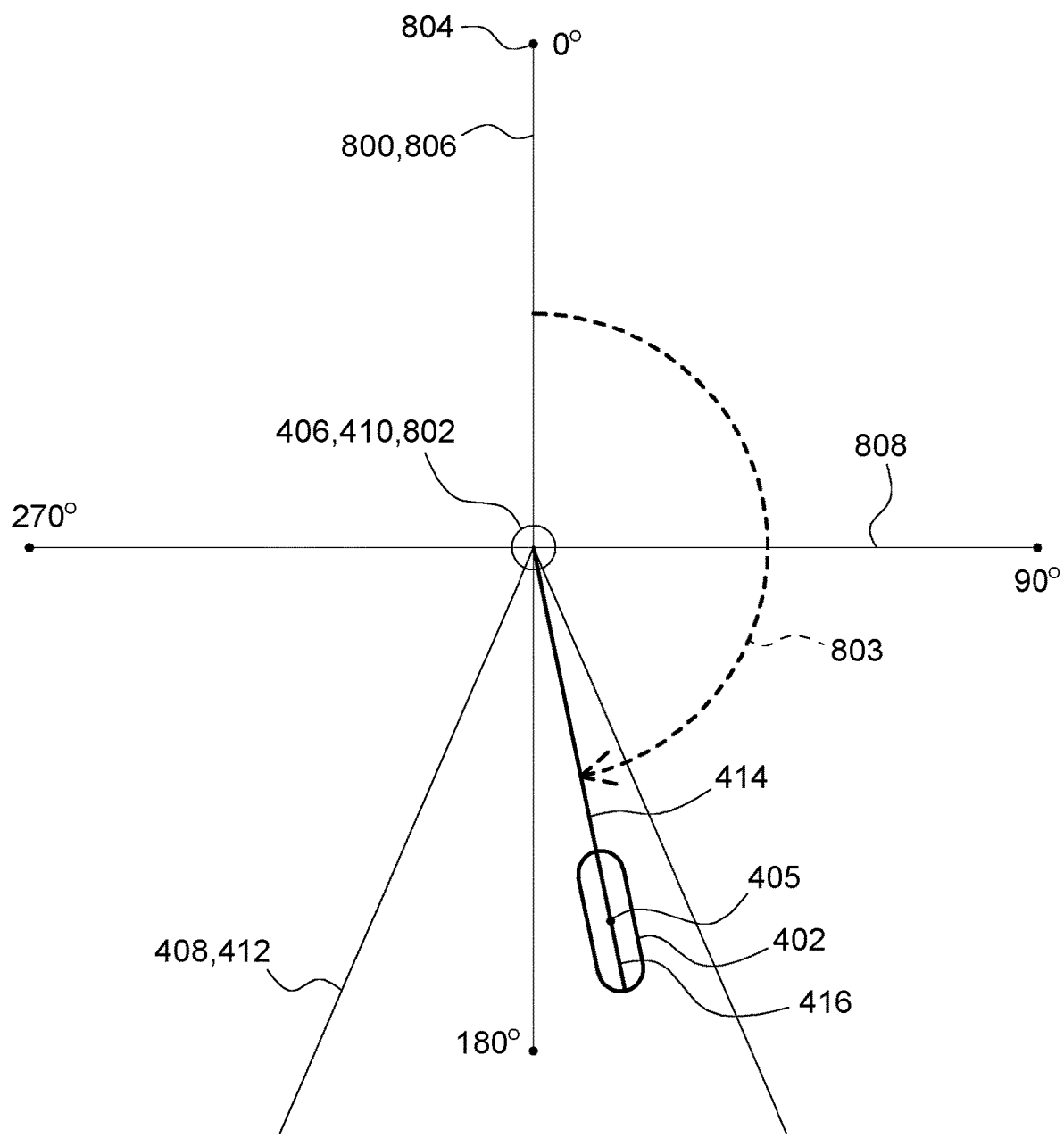
FIG. 8 is an enlarged view of the image show in FIG. 4 that illustrates an example coordinate system having an origin located at the reference location at a tip of a row unit cover.

FIG. 8 is another view of the image show in FIG. 4 and illustrates a coordinate system 800 having an origin 802 located at the reference location 406. The coordinate system 800 is used, at least in part, to identify an angle 803 of the position vector line 414. In the illustrated example, a 0° position is shown at 804 and is located at a top of the y-axis 806; the 90° position is located on the right-hand side of the x-axis 808; the 180° position is shown at the lower end of the y-axis 806; and the 270° position is shown at the left-hand side of the x-axis 808. In this way, the angle 803 of the position vector line 414 is determinable, and that angle 803 is used to quantify how the ear of corn 402 is moving between images. As a result, the image analyzer is capable of, for example, determining a change in position of an object between images and, consequently, determining a motion vector of the object. The image analyzer can use this information, other information, or a combination of this and other information to predict or detect whether the ear of corn 402 will be captured by the header 408 and form part of the harvested grain or whether the ear of corn 402 will end up being lost to the ground and form part of the grain loss.

FIG. 18 shows an example coordinate system 1800 that is used in a set of images and is similar to coordinate system 800. An object 1802 is positioned at two locations relative to the coordinate system 1800. Each of those positions 1804 and 1806 corresponds to a time, i.e., $T_1$ and $T_2$, respectively, in which an image of the object 1802 was taken. Thus, in FIG. 18, the images of the object 1802 taken at time $T_1$ and $T_2$ are superimposed relative to the coordinate system 1800. A first position vector 1808 extending from origin 1810 to a centroid 1812 of the object 1802 is the position vector at time $T_1$. The second position vector 1814 extends from the origin 1810 to a centroid 1812 of the object 1802 and represents the position vector at time $T_2$. In this example, the images of object 1802 taken at times $T_1$ and $T_2$ are consecutive images. A distal threshold 1816 of a header 1820 are also shown in FIG. 18

A first angle 1822 is measured relative to a 0° position 1824 at a top of the y-axis 1826 and the first position vector 1808. A second angle 1828 is measured relative to the 0° position 1818 and the second position vector 1814. A motion vector line 1830 extends between the centroid 1812 of the object 1802 at the position at time $T_1$ to the centroid 1812 of the object 1802 at the position at time $T_2$. Because the motion vector 1830 is directed towards the header 1820 and because the object at time $T_2$ is not beyond the distal threshold 1816, the image analyzer predicts that the object 1802 is captured by the header 1820.

Returning to FIG. 8, although the 2D coordinate system 800 is used in this example, in other examples, a 3D coordinate system can be used in a similar way to detect position and velocity as well as to predict a result (e.g., whether crop material is ultimately captured by a header) of the motion of an object. A third dimension of a position of an object in an image can be estimated based on a relative size of the object in the image. For example, if the object is larger in the image, the position of the object is closer to the image sensor. On the other hand, if the object is smaller in an image, then the object is farther away from the image sensor. The image analyzer uses the relative size of the object within an image or across multiple images to detect a position of the object in 3D space. Thus, although the examples contained herein are made in the context of a 2D coordinate system, the scope of the present disclosure encompasses determining a position of an object in 3D space using, for example, a 3D coordinate system. In the context of a 3D coordinate system, the angle 803 would be an angle within 3D space. In other examples, one or more stereo cameras are used to determine a position of an object such as crop material in three-dimensional space.

As shown in FIG. 8, the position vector line 414 defines an angle 803 of approximately 170° in the context of the coordinate system 800. Between images, a motion vector of an object is determinable using a change in length of the position vector line 414 and a change in the angle 803 of the position vector line 414. Further, if the time between images is known, a velocity vector of the object is determinable as well.

Preferably, the ear of corn 402 moves towards the header 408, which would be indicated a motion vector, and, as explained above, the motion vector is determinable using the position vector line 414 and angle 803. In FIG. 8, the angle 803 approaches 180°. For example, the angle 803 being in the range of 120° to 135° may be used to indicate crop material that will be captured by the header and, hence, be interpreted as harvested grain. Other angle ranges of angle 803 may also be used. For example, in some implementations, angle ranges between 110° to 180° are used to identify CGC as harvested grain. This angle range of angle 803 may vary depending upon where the ear of corn 402 exists in the image, for example, due to the perspective associated with placement of the region sensor. In the context of this example, the 180° angle indicates a direction towards the header 408. Further, with an angle near 180°, such as an angle within plus or minus 20° of 180°, and with the position vector line 414 increasing in length, the image analyzer can determine or predict that the ear of corn will be successfully captured by the header and, thus, form part of the harvested grain, as opposed to grain loss. In some instances, the value of angle 803 can be used as a confidence factor in predicting whether CGC is captured or not captured by the header. For example, in the context of the coordinate system 800 in FIG. 8, an angle within the range of 150 to 180 indicates crop material that is likely to be captured by a header. An angle within the range of 150 to 120 is still likely to be captured by the header but represents a lower confidence level. In a similar fashion, as the angle decreases, the confidence level that the crop material is captured by the header continues to decrease. However, the angle 803 is one of several factors that can be considered when determining whether crop material is captured or not captured by a header.

In FIGS. 4 through 7, though, as time passes (indicated by the progression of images from FIG. 4 to FIG. 7), the angle 803 defined by the position vector line 414 is decreasing. In FIG. 4, the angle is approximately 170°. However, that angel 803 decreases over time to where, in FIG. 7, the angle 803 is approximately 50°, i.e., less than 90°, which signifies that the ear of corn 402 is moving forward of the reference location 406. This indicates that the ear of corn 402 will likely be lost the ground and counted as grain loss. Further, the length of the position vector line 414 is decreasing in combination with the decreasing angle 803. As a result, the image analyzer determines that the ear of corn 402 is moving away from the header 408, as opposed to towards the header, and, with the angle 803 decreasing to less than 90°, the image analyzer counts ear of corn 402 as being grain loss. In the example shown in FIG. 7, because the reference location 406 identifies a portion of the header 408 that is a distal most point of the header 408 shown in the image, an angle 803 that is greater than 90° indicates that the ear of corn 402 is distally beyond the header 408 and therefore off of the header 408. In some implementations, the angular range interpreted as being grain loss is 160° to 200°. Again, this angular range may vary depending upon where the ear of corn 402 is present in the image due, for example, to the perspective represented by the image and the crop material's position in that image or, for example, when a 3D coordinate system is used, a 3D position of the ear of corn 402 relative to the header 408.

Other factors can also be taken into account in predicting whether crop material is captured by a header. For example, a future position based on a determined trajectory (e.g., using a motion vector or velocity vector) can also be used, either alone or in combination with the angle 803, to predict whether an ear of corn 402 is captured by a header 408. Further, a speed, direction, or both of the combine may also influence whether the ear of corn 402 is captured by the header. Thus, in some implementations, a direction, a speed, or both of a combine harvester are used to predict whether crop material is captured by a header.

As explained above, the image analyzer or another application or device generates the line 404 along the major axis of the ear of corn 402. In this example, the line 404 passes through the centroid 405. A rotation of the ear of corn 402 is detectable based on a change in length or orientation or both from one image to the next. A change in orientation of the line 404 relative to the coordinate system 800 is usable to indicate rotation of the ear of corn 402, such as in the plane of the image. A change in length of the line 404 provides an indication of rotation in a plane other than the plane of the image.

In some implementations, the image analyzer is operable to determine a position of different types of crop material based on a color present behind the crop material. For example, when a header has a particular color, e.g., green, the image analyzer is able to determine that the detected crop material is on or positioned over the header when the background color is green or another color associated with the header. Similarly, if the background color is brown or a color consistent with the ground, the image analyzer is capable of determining that the crop material is positioned on or over the ground. If a background color is blue or a color consistent with the sky, the image analyzer is capable of determining that the detected crop material is in the air. Other background colors associated with other objects can similarly be used to identify where in space the detected crop material is located. Further, a relative size of the crop material within an image or using image shift where the region sensor is a stereo camera can be used to determine how close the crop material is to the region sensor and, by extension, how close the crop material is to other objects present in the image. Using this position information and the color information, the image analyzer is operable to determine where the detected crop material is in reference to other objects or features represented in an image.

In some implementations, the image analyzer performs a similar analysis on other types crop material. Thus, in some implementations, the image analyzer identifies and tracks movement and ultimately whether the crop material is captured by the header or lost to the ground of a variety of different types of crop material simultaneously.

Additional functionality of the image analyzer includes determining whether the crop material, such as CGC (e.g., EHP), is attached to a plant (i.e., an on-plant condition), contacting or resting on the harvester, in the air, or on the ground. If the crop material is determined to be on the ground, the image analyzer is also capable of determining whether the crop material was on the ground prior to harvest or as a result of the harvesting operations. For example, if the crop material is determined to be on the ground and, over the course of several image, is moving in a direction downward in the image (e.g., from the top edge 418 of the image in FIG. 4 towards the bottom edge 420 and disappearing from the image upon reaching the header 408), the image analyzer identifies that particular crop material as being on the ground prior to the harvesting operation. Disappearance of the crop material upon reaching the header 408 is the result of the crop material passing underneath the header 408.

With the use of a position vector line, such as position vector line 414, and other information, such as a configuration of a header and the agricultural vehicle coupled to the header (such as a combine harvester), the image analyzer is operable to determine various details about crop material shown in an image or series of images. For example, the image analyzer is not only operable to identify different types of crop material present within an image but is also operable to determine whether crop material is stationary (e.g., a length and angle of the position vector line is unchanged in two or more consecutive images); the crop material is moving towards the header or some part thereof, such as a cross-auger of a header (e.g., the length of a position vector line associated with the crop material is increasing and the reference angle to a defined coordinate system is within a selected range of 180°); the crop material is moving away from the header (e.g., the length of the position vector line is decreasing (if not distally beyond the reference point or the position vector line is increasing and the associated reference angle is between 0° and 90° or 270° and 360°); a rotation and amount of rotation of the crop material (e.g., by a change in length or angle of a line extending along an axis of the crop material); or an angle of impact of the crop material relative to another object. An impact is determinable based on a change in direction between images, and an angle of impact is determinable based on a position vector line and reference angle, as explained earlier.

Figure 9:
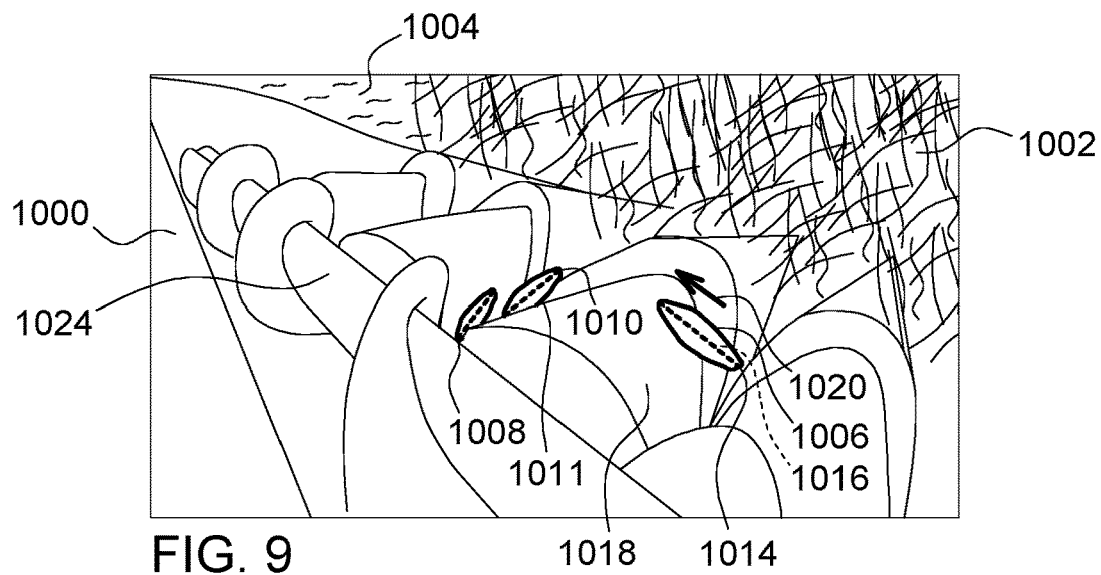
FIGS. 9 through 11 are a series of images of a region forward and above an example header obtained by an image sensor, according to some implementations of the present disclosure.
Figure 10:
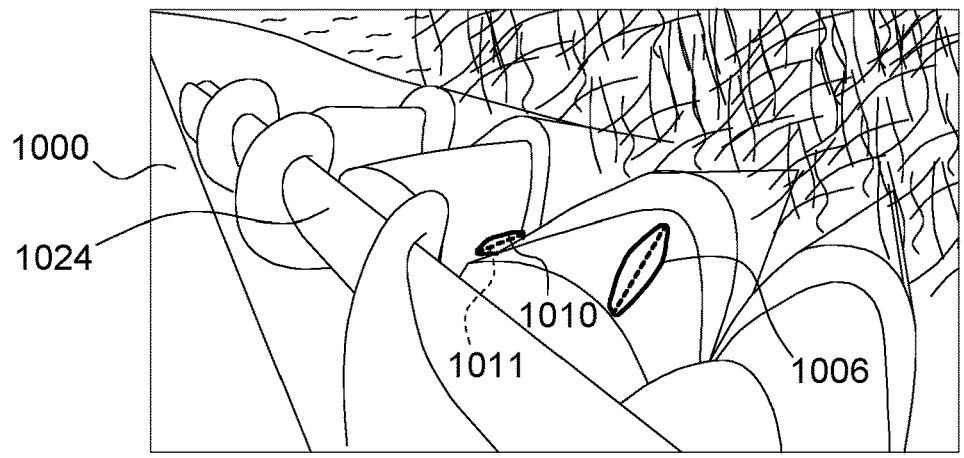
Figure 11:
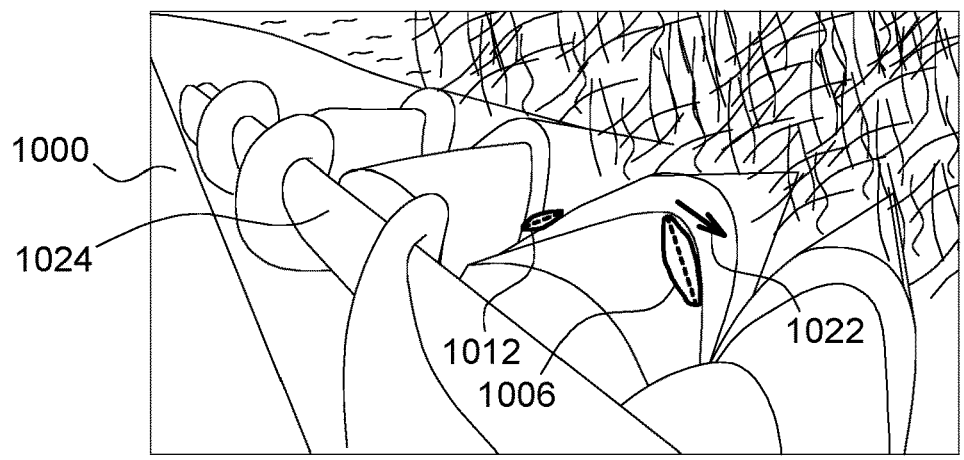

FIGS. 9 through 11 show another sequence of images of a region forward and above a header 1000 obtained by a region sensor, such as region sensor 206. The header 1000 is operating to harvest crop 1002 while being propelled through a field 1004. As shown in the images, an image analyzer, such as image analyzer 224, identifies CGC. Here, the CGC are ears of corn 1006, 1008, 1010, and 1012. In this example, the image analyzer has identified each of the ears of corn 1006 through 1012 by generating an outline 1014 around each ear of corn, and the image analyzer has also generated a line 1016 extending along a major axis of each ear of corn, passing through a centroid of each ear of corn. The image analyzer is also operable to determine movement of the ears of corn relative to the header 1000 using the principles discuss herein. Although a reference location is not shown in FIGS. 9 through 11, a reference location similar to reference location 406, may be used to detect movement of the ears of corn, for example.

In this sequence of images, the image analyzer detects that ear of corn 1006 bounces based, for example, on a changes to a position vector line, which may be similar to position vector line 414, relative to a reference location. As explained above, in some implementations, a change in length and angle relative to a reference location and coordinate system from one image to another is used to determine, among other things, a change in position of the crop material relative to the header 1000. Using the images shown in FIGS. 9 and 10, the image analyzer is operable to determine that the ear of corn 1006 is moving upwards and towards a cover 1018 of the header 1000, as indicated by arrow 1020. From the image of FIG. 10 to the image of FIG. 11, the image analyzer is similarly able to determine that the ear of corn 1006 has moved downwards as indicated by arrow 1022. In contrast, the line 1011 representing the major axis of ear of corn 1010 maintains a similar orientation from FIG. 9 to FIG. 10. This orientation represents desirable behavior of a harvested ear of corn and results in efficient movement of the ear of corn 1010 into auger 1024 for subsequent movement along the header 1000. Consequently, the image analyzer is operable to detect behaviors of CGC at the header 1000, including bouncing of ears of corn or other CGC, such as EHP. A controller, such as controller 200, is operable to include this bouncing data as part of measured distribution data and use the measured distribution data, ultimately, to control one or more settings of the header 1000.

Bouncing of corn ears may represent excessive forces being applied to the crops or CGC during harvesting. Excessive forces, i.e., forces in excess of forces needed to successfully harvest the CGC, may cause ears of corn to escape from header, resulting in grain loss. Excessive forces may also lead to shatter losses, such as butt shelling, where CGC such as corn ears are caused to impact a portion of the header and cause one or more kernels to separate from the corn ear. These kernels often times are lost to the ground as grain loss. Further, bouncing of CGC, such as corn ears, increases the residence time of the CGC on the header and, therefore, results in a delay in transporting and, in some instances, processing of the CGC. This delay can result in a buildup of crop material on the header, which can further diminish the performance of the header and result in increased grain loss.

Figure 12:
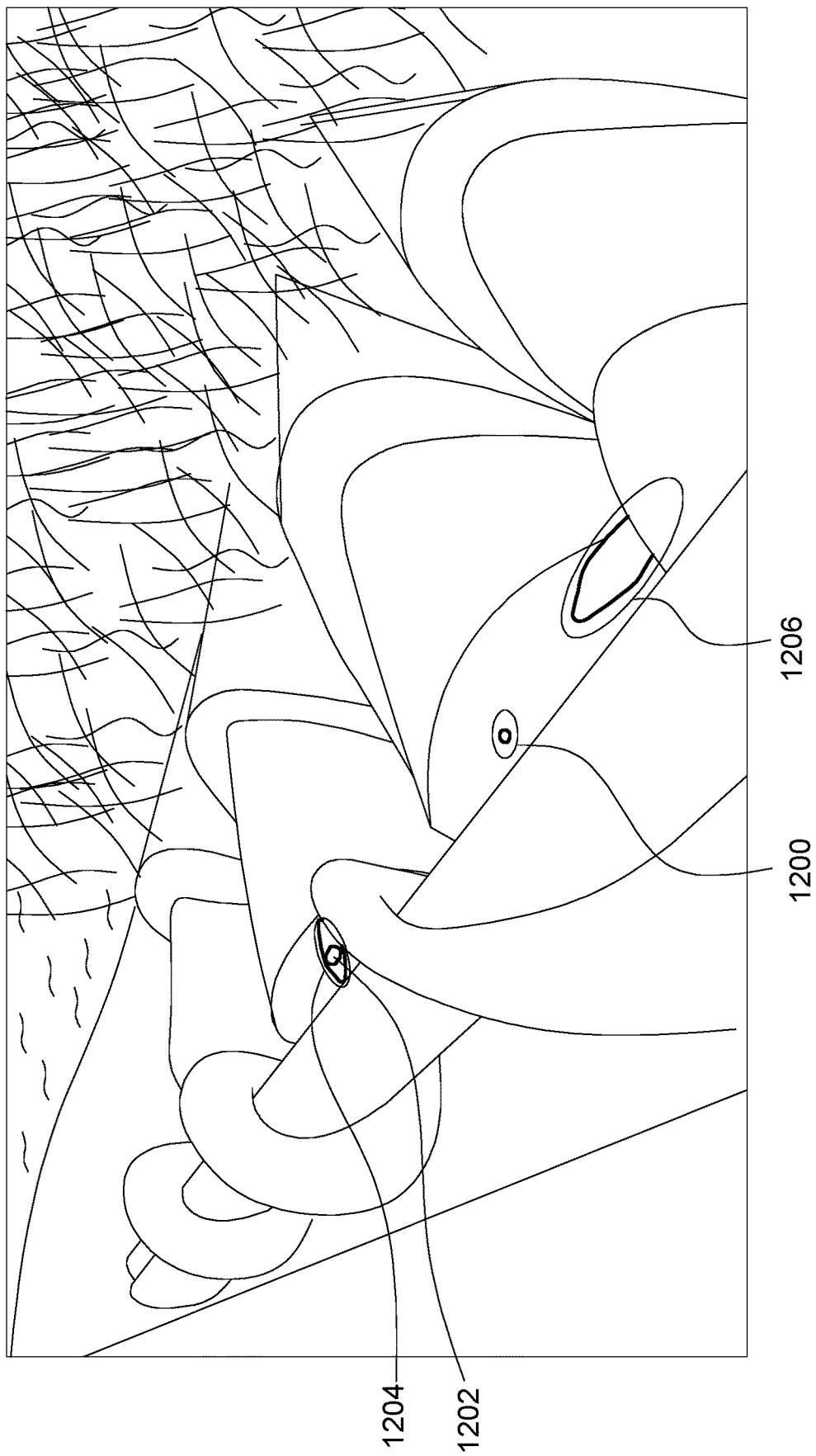
FIG. 12 is another example image showing an area adjacent to an agricultural header along with crop material located adjacent thereto, according to some implementations of the present disclosure.

The image analyzer is also able to discern and identify grains from an ear, head, or pod. For example, the image analyzer is operable to detect kernels 1200 of corn, such as kernels that have been separated from an ear during harvesting, as shown in FIG. 12. In some implementations, the number of separated kernels are estimated from a discolored portion of a detected ear, which represents missing kernels. For example, a portion 1202 of ear of corn 1204 has a color other than yellow. The image analyzer interprets the color change as representing missing kernels. As a result, the number of loose kernels is estimated by, for example, estimating a size of the portion 1202 in light of an average size of a corn kernel. Another ear of corn 1206 is also identified in FIG. 12. In some implementations, the different crop components are identified differently. For example, in some implementations, kernels or other individual grains are identified in one way, such as being encircled with line type that is different from a line type used to identify another part of the crop, while whole ears of corn are identified in another way, and partial ears of corn are identified in still another way. Thus, an ear of corn is identified using a line that has a different color than the line used to identify an individual kernel. Other than line color, different line types may also be used. Still further, different crop materials may be identified using any other type of approach, such as using flashing identifiers, symbols, or characters.

Therefore, the image analyzer is operable to identify different types of crop materials and detect and monitor a position and movement of those crop materials relative to the header or some other feature within an image. For example, the image analyzer is operable to determine a location of the crop material (e.g., using a position vector line or background color), particularly a position relative to a header; a direction of movement, particularly relative to a header (e.g., a direction of movement fore or aft relative to the header); bouncing relative to the header; a stationary position relative to the header (e.g., when crop material is resting on the header); and a speed of the crop material (e.g., based on the extent to which a position change between one image to the next of the crop material occurs). Using this information gleaned by the image analyzer from the captured images, the image analyzer 224 or some other software application, whether located on or remotely communicably connected to the header control system 112, characterizes the information, such as in the form of different parameters, as indicated at 306 in FIG. 3.

The information may be categorized based on, for example, the types of crop materials detected. For example, the crop material is characterized based on material type. In the context of corn, the crop material may be characterized by individual kernels (as represented by reference number 1200 shown in FIG. 12), ears of corn, partial ears of corn (determined, for example, by a length of ear less being than a selected length), husk material, or other MOG. Thus, in some instances, the crop material is classifiable by ear, pod, or head and by individual grains of the crop. In some implementations, the detected crop material can be further characterized in various ways. For example, the crop material can be further classified according to parameters such as direction of travel, speed, whether an impact has occurred (which may indicate that the crop material is bouncing on the header), and whether the crop material ultimately lost from the header or is captured by the header.

At 308, the characterized information is converted into a measured distribution. For example, a measured distribution for each parameter of the characterized information is generated. Generating the measured distribution may be made in terms of percentages (e.g., number of bouncing EHP per defined area), counts (e.g., number of EHP moving away from the header), or in any other desired way. For example, the distribution for each parameter may be made on the basis of area, e.g., hectares, a period of time, row of crops, or on the basis of a portion of a header, such as per row unit of a corn header. However, distributions may be made on other bases (basis?) (and) are within the scope of the present disclosure. With reference to FIG. 2, the measured distribution data are stored as the measured distribution data 220 on the memory 204 of the controller 200. However, the measured distribution data may be stored at any desired location.

At 310, the measured distribution of each parameter is compared to a target distribution for the corresponding parameter. The target distribution for each parameter is preselected and may define threshold values for each parameter. Referring to the example of FIG. 2, the target distribution data are stored as the target distribution data 222 on the memory 204 of the controller 200. However, the target distribution data may be stored at any desired location. At 312, one or more settings of a header are altered when a measured distribution value of the measured distribution data does not satisfy criteria contained in the target distribution data. For example, when a measured distribution value for a parameter meets or exceeds the defined threshold, a change is applied to a component or system of the header or agricultural vehicle coupled to the header. Thus, when a measured distribution for a parameter contained in the measured distribution data fails to satisfy the corresponding criteria in the target distribution data, the controller, such as controller 200, generates a signal, for example, to cause a change in position of an actuator to alter a setting of the header. In some instances, based on the type of parameter, different actuators are actuated to adjust different settings of the header or agricultural vehicle coupled to the header.

Further, in some implementations, the criteria provided in the target distribution data are selected such that changes to the settings of the header are implemented before grain loss in the course of the harvesting by the header occurs. Thus, the present disclosure provides for proactive control of a header or agricultural vehicle in order to reduce or eliminate grain losses due, for example, to engagement of the crops with the header.

In still other implementations, the measured distribution data are used to control one or more settings of a header, e.g., by adjusting one or more actuators, without being compared to target distribution data. For example, in some instances, a controller, such as controller 200, directly utilizes the measured distribution to control one or more settings of a header.

In some instances, other data may be used to adjust a setting of header in response to a comparison between measured distribution data and target distribution data. For example, data such as grain loss data, grain quality data, grain cleanliness data, rear image data, component performance data, and component usage data are used. The different data types may be obtain using, for example, a grain loss sensor, a grain quality sensor, a grain cleanliness sensor, and an image sensor. Other data may be provided at other times, such as during maintenance of the header or agricultural vehicle coupled to the header. Example uses of other data types are provided above.

For example, in some implementations, machine performance data or usage data includes a number of actuation cycles a component of a header experiences or a time period during which a component has been operating since installation. In such instances, a controller, such as controller 200, utilizes the performance data or usage data to provide recommendations. For example, component wear information may be utilized to limit or reduce an amount of wear experienced by a component and, thus, prolong a service life of the component. Components that may utilized wear information include, for example, stalk rolls or sickle knives. In other instances, performance information is used to address material creep or component loosening. For example, over time, gathering chains may develop slack due to loosing, and the controller may adjust the chains to reduce or eliminate the slack.

Figure 13:
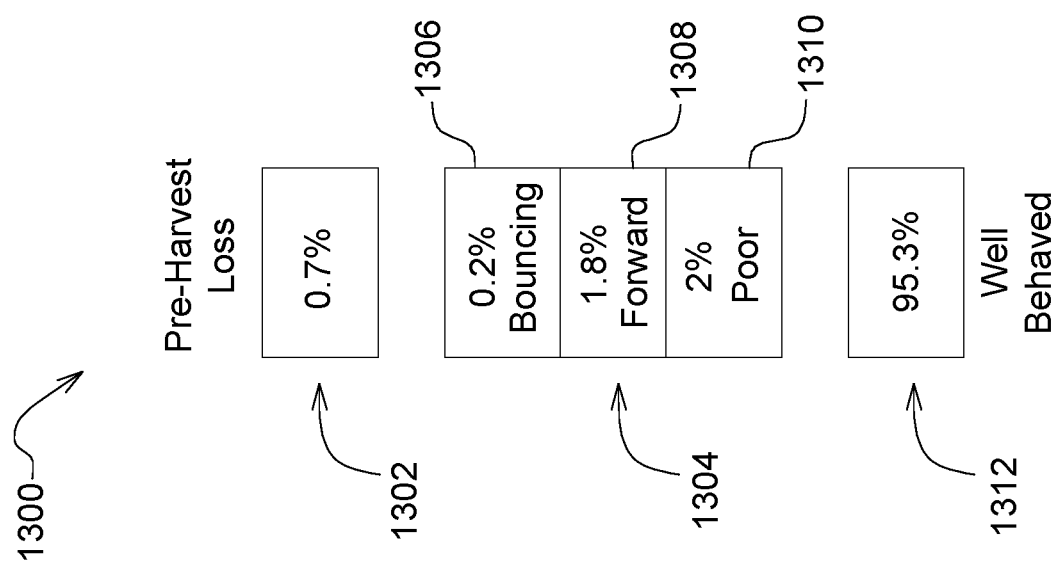
FIG. 13 is an example graphical user interface, according to some implementations of the present disclosure.

FIG. 13 is an example graphical user interface ("GUI") 1300. The GUI 1300 may be similar to the GUI 214 described above. The GUI 1300 is provided on a display, such as display 212, and shows crop information gathered during a harvesting operation. The GUI 1300 displays, for example, output from a comparison between measured distribution data and target distribution data. For example, on display portion 1302, pre-harvest grain loss is represented. In the illustrated example, a percentage of crop that is determined to be pre-harvest grain loss is presented.

In some implementations, pre-harvest grain loss is determined using a predicted yield of an area being harvested along with data representing grain determined to be pre-harvest grain loss. In some implementations, actual yield data of a previous season is used as the predicted yield data. In other implementations, predicted yield is determined using preexisting data in combination with sensor data taken during a harvesting operation to generate predicted yield. In still other implementations, yield data taken during a harvesting operation is projected, for example, based on an area being harvested, to generate predicted yield data.

In some instances, pre-harvest grain loss is detected using a pre-harvest grain loss sensor. In some implementations, a region sensor, such as region sensor 206, is operable to sense pre-harvest grain loss, and an image analyzer is operable to determine pre-harvest grain loss present in a captured image. As explained above, pre-harvest grain loss can be identified by how the detected grain moves through an image. For example, referring to FIG. 4, if grain is first detected at top edge 418, which indicates that the grain was present on the ground prior to the header ever engaging with the crops, then the image analyzer (or other application) is operable to determine that the detected grains are pre-harvest grain loss. Using the grain loss determined to be pre-harvest grain loss and the predicted yield information, a percentage of the predicted yield determined to be pre-harvest gain loss is determinable and presented to a user at 1302.

Harvested crop, e.g., CGC, that have been determined to exhibit deviant or undesirable behavior (such as determined through comparison of measured distribution data and target distribution data) is displayed on display portion 1304 of the GUI 1300. Using the techniques described earlier, an image analyzer, such as image analyzer 224 or other application or device, is operable to detect how individual crop components, e.g., individual grains, EHP, or MOG, are moving relative to the header. As explained, these data are categorized and accumulated into measured distribution data.

The display portion 1304 is divided into segments 1306, 1308, and 1310. Although three segments are provided in the illustrated example, in other implementations, additional or fewer segments may be included. Each segment displays information (which may be presented in a variety of different ways, as described in more detail below) corresponding to a different type of deviant behavior. For example, segment 1308 represents a percentage of CGC moving forward relative to the header. In some instances, in the context of FIG. 8, forward movement is indicated by an angle between 0° and 90° or between 270° and 360° and a position vector line that is increasing in length. Forward movement is indicative of crop material that has a likelihood of ending up as loss onto the ground. In the illustrated example, 1.8% of the predicted yield (determined using detected crop material representing grain (e.g., CGC) and the predicted yield data) are determined to be moving forward relative to the header.

Segment 1306 represents a percentage of the CGC that is determined to be bouncing on the header. Here, 0.2% of the yield (e.g., CGC) is determined to be bouncing on the header. In some instances, actual yield values are used, and, in other instances, predicted yield values are used. Bouncing crop material is determinable, such as in in the manner described earlier. Segment 1310 represents a total percentage of crop grain material relative to predicted yield that is determined to have behaved in an undesirable manner and is a summation of the other segments 1306 and 1308. In the illustrated example, the total percentage of grain that is determined to have behaved in an undesirable or deviant manner is 2%. In some implementations, each segment represents a different type of undesirable crop behavior, and a segment representing a total of all of the types of undesirable behavior is omitted.

Display portion 1312 displays a portion of the harvested crop that is determined to have exhibited favorable behavior. In some implementations, the portion exhibiting the favorable behavior is determine via a comparison of the measured distribution data and the target distribution data, as described earlier. For example, in some implementations, CGC that does not bounce or move forward relative to the header or CGC that is not lost to the ground qualifies as crop material having favorable behavior during harvesting. In the illustrated example, the portion representing favorable behavior is shown as a percentage, e.g., 95.3%.

In some instances, the display segments 1302, 1304, and 1312 are data sets associated with a single row unit or portion of a header. Presenting the data in this way provides for adjusting aspects of the header at a granular level, for example, controlling aspects of row units individually to improve overall header performance. In other implementations, the presented data may be presented as data associated with a number of passes through a field, e.g., a single pass. Further, the data may be presented in any number of other ways or in a combination of different ways.

Figure 14:
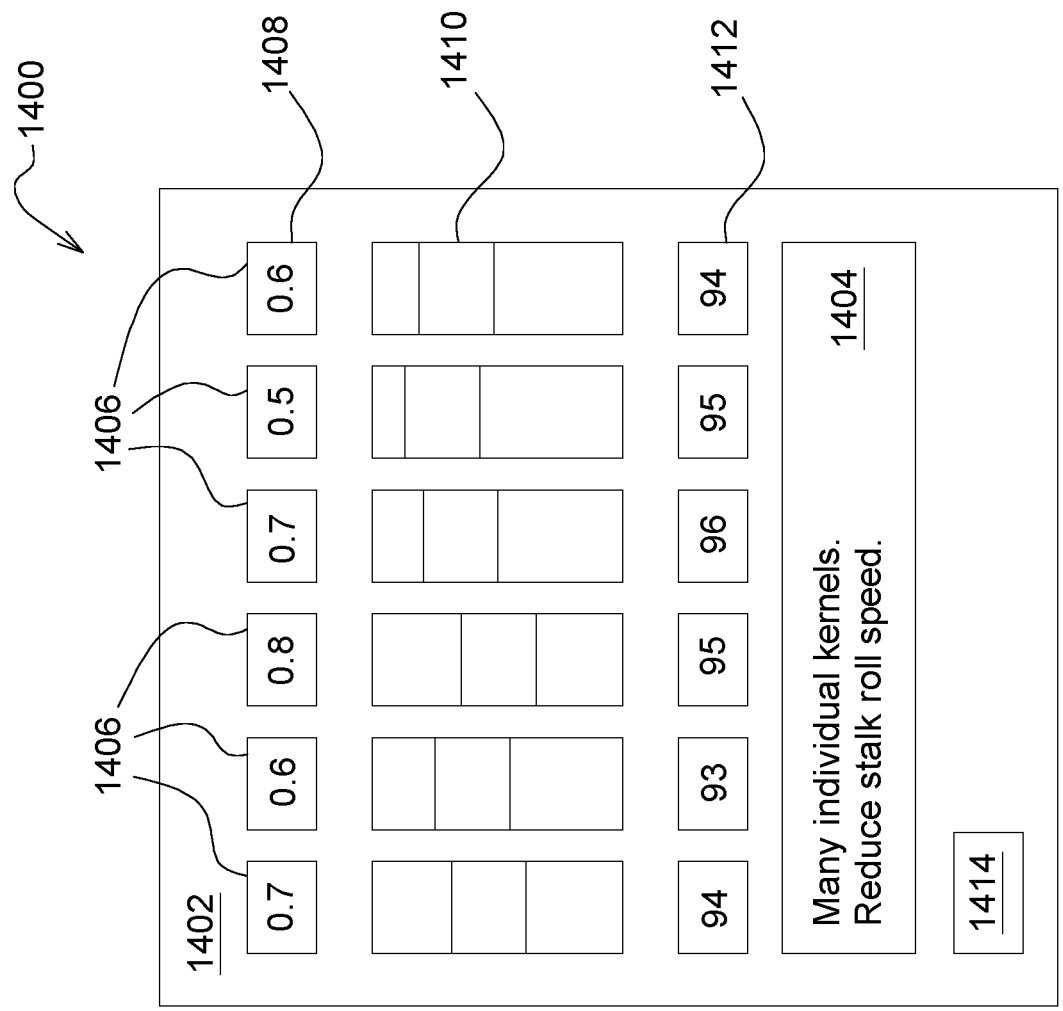
FIG. 14 is another example graphical user interface, according to some implementations of the present disclosure.

FIG. 14 is another example GUI 1400 that includes a first display portion 1402 and a second display portion 1404. The first display portion 1402 includes a plurality of display segment groups 1406, with each display segment group 1406 containing display segments 1408, 1410, and 1412, which are similar to the display segments 1302, 1304, and 1312, respectively, described above. In some implementations, the display segments 1408, 1410, and 1412 of each display segment group 1406 represents a type of behavior of crop material during a harvesting operation. For example, in some instances, the display segments 1408, 1410, and 1412 of each display segment group 1406 represent undesirable behavior, a component representing desirable behavior, and pre-harvest loss, as explained earlier. In other implementations, the different display segments may represent other types of information associated with header operation including information associated with a comparison between measured distribution data and target distribution data.

In some implementations, the different segment groups 1406 represent performance of each row unit of a header. In such instances, the performance of each row unit is monitored, and each row unit is adjustable independently based on the monitored performance. In some implementations, performance of the header is monitored using groups of rows. Thus, in some instances, the performance of the header is monitored on the basis of a component-by-component basis (e.g., based on the performance of each row unit) or on the basis of grouped components of the header (e.g., by groups of row units).

The second display portion 1404 contains cause and mitigation information. For example, information related to a cause of undesirable crop harvesting performance is displayed in the second display portion 1404. In some instances, a cause of undesirable performance is determined based on an analysis of the measured distribution data, comparison between the measured distribution data and the target distribution data, or both. In some instances, the measured distribution data includes data from a plurality of rows of a header and over a selected period of time. In some implementations, the analysis of these data are performed using numerical analysis, rules, one or more neural networks, machine learning algorithms, either alone or in combination with each other. In some instances, other types of data are also used to determine cause and mitigation information. For example, local data (i.e., data stored locally), non-local data (e.g., data stored remotely), recent data, historic data, or a combination of these data types may be used in combination with the measured distribution data and the target distribution data, or both to determine cause and mitigation information. In some instances, these data are based on, for example, design data, simulation data, digital twin data, field test data, machine data, fleet data, or crop data.

Based on the analysis described above, one or more predicted causes of an undesirable performance or behavior of crop material is determined. The predicted cause or causes is displayed on the second display portion 1404. In addition, one or more mitigation actions generated in response to the predicted cause or causes is also presented in the second display portion 1404. In some implementations, the mitigation actions represent changes to the header, e.g., changes to one or more settings of one or more components of the header, to address the predicted cause or causes to correct the determined performance deficiencies or undesirable behaviors.

In some implementations, the mitigation actions are automatically implemented. In some instances, a user, such as a remote or local operator, is notified about mitigation actions that are automatically implemented. The user may be notified visually, audibly, or haptically. For example, in some instances, information, such as one or more pieces of information related to mitigation action, may be output as speech. Output may also be presented in other ways. In other implementations, the mitigation actions are executed upon approval by a user, such as by an input by a user. In still other implementations, a user, such as an on-board operator, is able to review the predicted cause information and the determined mitigation actions and adjust machine settings via an user input device 1414, such as a switch, dial, touch screen, microphone, or other type of device. In the illustrated example, the input device 1414 is a portion of a touch sensitive display that is defined to perform a desired operation, such as receive a user input.

Figure 15A:
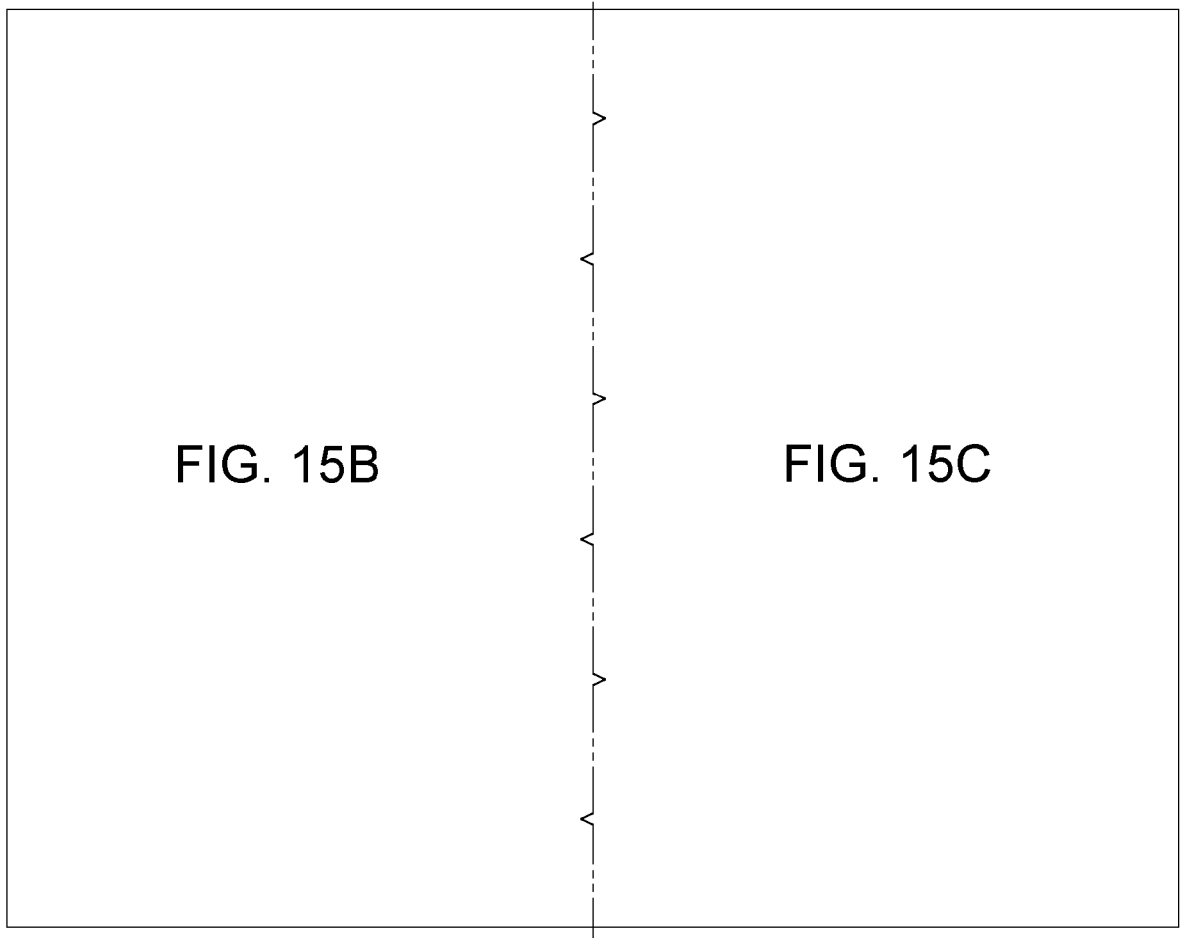
FIG. 15A is a schematic illustration of how the parts of a table collectively represented in FIGS. 15B and 15C are positionally arranged.

FIG. 15A is a schematic illustration of how the parts of a table 1500 collectively represented in FIGS. 15B and 15C are positionally arranged. FIGS. 15B and 15C show the parts of the table 1500. The table 1500 contains example mitigation actions based on image analysis of crop material, such as CGC (e.g., EHP), and other data used in determining the mitigation actions. In some implementations, the other data may be omitted in determining the mitigation actions. Thus, in some implementations, the mitigation actions are determined based on the comparison between the measured distribution data and the target distribution data and without the use of other data.

Column 1502 identifies image analysis results that are obtained in the course of determining the mitigation action or actions. Column 1504 identifies a distribution parameter of the detected crop material, e.g., CGC. That is, column 1504 identifies a distribution parameter that describes an unfavorable behavior of the detected crop material. Although not provided in the table 1500, in some implementations, a cause associated with the unfavorable behavior is predicted based on an analysis, as explained earlier. Column 1506 defines a mitigation action or actions determined based on the detected unfavorable behavior. Using the predicted cause of the undesirable behavior, the mitigation action is determinable. For example, based on a prediction that a particular setting of a component of a header is causing the undesirable behavior, a mitigation action is determined to alter the setting of the component of the header in order to reduce or eliminate the undesirable behavior. In some implementations, the undesirable behavior may be the result of a plurality of header settings, and alteration of each of the plurality of setting may be performed as a mitigation action to reduce or eliminate the undesirable behavior. Column 1508 identifies other or supplemental data that are used in combination with the image analysis results data to determine the mitigation action or actions.

Referring to row 1510, the image analysis results identify an undesirable behavior as being CGC material and particularly EHP crop material being dropped from one or more areas of a header. For example, in some instances, material being dropped from a gathering area of a row unit of a header is identified as an undesirable behavior. The associated distribution parameter, which triggers the generation of a mitigation action, is a selected number of EHP dropping in a designated zone on the header. When a selected number of EHP are detected as dropping onto the designated zone, a determined mitigation action is to reduce a speed that the agricultural vehicle travels through a field. Additionally, supplemental data used in determining a mitigation action are the current speed that the agricultural vehicle is traveling through the field. At row 1512, the image analysis results identify the undesirable behavior as being ear wedged on deck plates of a header. The distribution parameter is ears on the deck plates with a selected amount of movement thereon (e.g., a selected rate of movement or a selected amount of displacement). In this example, when the distribution parameter criterion is satisfied, the mitigation action is to reduce a speed of a stalk roll of the associated row unit and adjust an amount of separation of deck plates. The supplement data used in determining the mitigation action in row 1512 are the current stalk roll speed and the current deck plate separation amount at the opposing ends (i.e., the front and back) of the deck plates.

At row 1514, the image analysis results identify the undesirable behavior as being stalks entering a cross auger of the header. The associated distribution parameter criterion is detection of MOG entering the combine harvester coupled to the header. The mitigation action is to increase a speed of the stalk roll when a selected amount of MOG enters the combine harvester or when a selected amount of stalk material is detected at the cross auger. Supplemental data used in determining the mitigation action are the current stalk roll speed of a row unit. At row 1516, the image analysis results are the detection of an unacceptable amount of shelling at the deck plates. The distribution parameter is detection of a selected amount of individual kernels on the header, and the mitigation action is adjustment of the deck plate separation and adjustment to the roller speed when the selected amount of individual kernels on the header is detected. Supplemental data used in determining the mitigation action are the current deck plate separation, grain damage data, and grain loss data.

At row 1518, the image analysis identifies the undesirable behavior as being whole stalks moving into the combine harvester. The distribution parameter is detection of a selected number of whole stalks moving from a row unit to a cross auger of a header. The mitigation action is reducing a speed of the gathering chains of the row unit or reducing a speed of the stalk roll of the row unit, and the supplemental data used are the current gathering chain speed and the current stalk roll speed. At row 1520, the image analysis identifies the undesirable behavior as being undesirable vibration of one or more stalks or stems, and the distribution parameter is the detection of a selected number of separations of EHP from the stalks or stems due to the undesirable vibration. The mitigation action is to sharpen sickle knives used to sever the stalks or stems from the ground, and the supplemental data used are the number of hours since the sickle blades were last sharpened or replaced.

The principles described herein are also applicable to headers used in intercropping in which a field being harvested includes two or more different crops that are arranged such that the header encounters at least two of the different crop types during a pass through the field during harvesting. An example type of intercropping within the scope of the present disclosure is relay cropping in which one or more crop types are harvested during a harvesting operation while one or more other intercropped types are not harvested during the harvesting operation.

In the context of relay cropping, an image sensor, such as region sensors 206, collect image data, and the collected image data are analyzed, such as by image analyzer 224. The image analyzer recognizes the crops of one or more crop types that are not to be harvested and, in some instances, disregards the image data associated with those crop types. Consequently, in some instances, the image analyzer functions to act on image data associated with the crop types being harvested and ignores the image data associated with the crop types not being harvested. Thus, the image analyzer is operable to distinguish between crop material associated with the one or more crop types being harvested and the crop material of the one or more crop types not being harvested and, in some instances, act exclusively on the image data associated with the one or more crop types being harvested.

In some implementations, the different crop types of relay cropping are arranged in adjacent rows through a field. With such a crop arrangement, one or more of the display segment groups 1406 shown in FIG. 14 associated with the rows of the crops that are not being harvested may be greyed out, blank, absent, or otherwise devoid of information.

In some implementations, an image analyzer assesses any damage being inflicted on the crops of the unharvested crop types and adjusts one or more settings of the header to reduce or eliminate the damage. For example, image data obtained from an image sensor may detect crop material identified as being from a crop type not being harvested in a harvested crop material stream on the header. For example, soybeans and wheat may be intercropped together. During a harvesting operation, the wheat alone is to be harvested. However, green soybean plant material from the soybean plants may be detected in a harvested crop stream of golden wheat on the header by an image sensor, such as a region sensor 206. Thus, in some implementations, an image analyzer, such as image analyzer 224, distinguishes crop material of the crop type not being harvested from the crop material of the crop type being harvested using, for example, color recognition and comparing colors of the detected crop material. If an amount of green soybean plant material satisfies a selected criteria (e.g., if the amount of green soybean plant material exceeds a threshold amount), a controller, such as controller 200, performs a mitigation action. In some instances, a mitigation action includes, for example, raising the header, changing the angle of the header, changing the speed of the harvester, or changing attributes of the reel of the header. Other mitigating actions may be performed to reduce harvest or capture of plant material associated with a plant type not being harvested.

Figure 16:
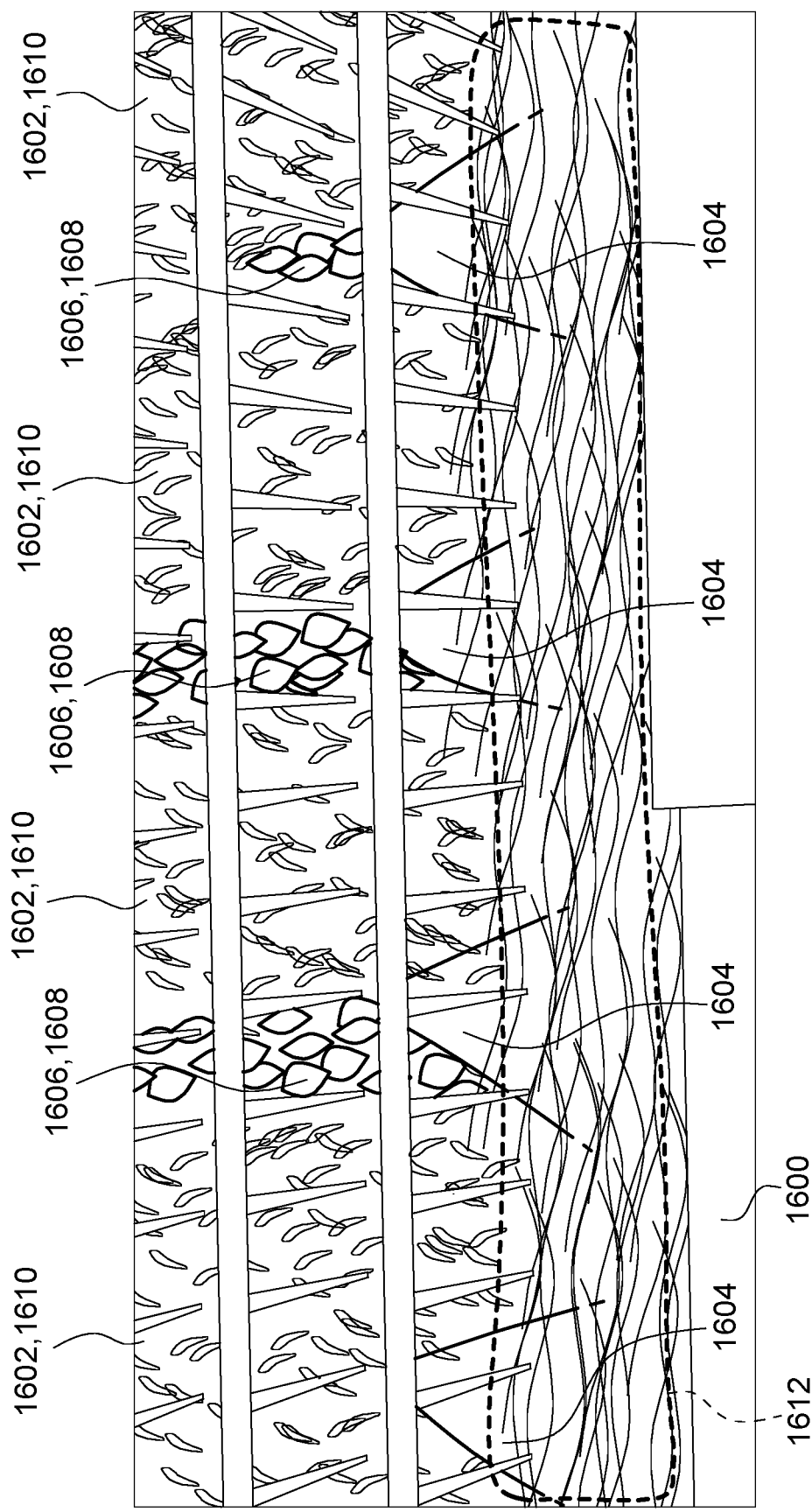
FIG. 16 is an example image captured by an image sensor that shows a region above an agricultural header, according to some implementations of the present disclosure.

FIG. 16 shows an example image captured by an image sensor, such as a region sensor 206. The captured image shows a region above a header 1600. The header 1600 is harvesting a first crop type 1602. Here the first crop type 1602 is wheat, and the wheat crops have a first color (e.g., a gold color) and are engaged with and being harvested by the header 1600. Portions 1604 of the header 1600 are aligned with a second crop type 1606 that are arranged in rows 1608 between rows 1610 of the first crop type 1602. Here, the second crop type 1606 is soybeans, and the soybeans have a green color. The portions 1604 pass over the crops of the second crop type 1606 in order to prevent the crops of the second crop type 1606 from being engaged and damaged by the header 1600. For example, the portions 1604 may bend or press the crops of the second crop type 1606 away from the header to prevent engagement of the crops of the second crop type 1606 from cutting components of the header 1600. A region 1612 of the captured image shows a flow of crop material across the header 1600. By analyzing region 1612, the presence of crop material from the second crop type 1606 in the flow of crop material is determinable, e.g., based on a difference in color between the two different crop types. Where crop material from the second crop type 1606 is not detected, a mitigating action is avoided. In some implementations, supplemental data from other sensors, such as a crop impact sensor used to detect crop losses, are used in combination with the image sensor to detect damage to crops of the second crop type 1606.

In other examples of intercropping, two or more crop types, e.g., corn and soybeans, are harvested at the same time. During the course of the simultaneous harvesting of the different crop types, a single flow of harvested material may be produced. Where a single flow of crop material is produced, an image analyzer, such as image analyzer 224, is configured to recognize the crop material, e.g., EHPs, for each crop type. The image analyzer performs an analysis on each crop type and generates relevant information for each crop type. The generated information, such as in the form of measured distribution data, are analyzed, such as by comparison to target distribution data, as described above to adjust one or more settings of the header.

In the context of an example GUIs similar to the GUIs 1300 and 1400 of FIGS. 13 and 14, additional information, such as crop type, is also displayed. In some implementations, cause and mitigation action information displayed in a second display portion, which may be similar to second display portion 1404 of FIG. 14, can include one or more recommendations on how to adjust the header to reduce or eliminate grain losses or information on actions taken automatically.

In some implementations, remedial actions performed on the header (e.g., changes to one or more settings) take into account market value of crop loss, estimated volume or mass of crop loss, or other parameters. In some implementations, a GUI, such as GUI 214 or GUI 1300, provides information to the user, such as an operator, that allows the user to define how and whether an adjustment is to be applied to a header based on, for example, the types of information to be taken into account. For example, the information taken into account may alter a corrective action (e.g., settings adjustment) made to a header for a detected operational deficiency of the header. For example, a particular market price of the crop being lost may result in one type of corrective action for a detected deficiency, where a different market price may result in a different corrective action based on the identical detected operational deficiency. Similarly, for a particular detected operational deficiency, a difference in the type or types of information taken into account by a controller, such as controller 200, may result in a different corrective action taken. In some implementations, the GUI also provides controls that allow the user to select how adjustments associated with corrective actions are to be applied to the header, e.g., manually, automated, automated with consent, etc. In some implementations, the GUI also includes controls for adjusting actuators of the agricultural vehicle, such as actuators associated with grain separation, cleaning, residue discharge, etc., of a combine harvester.

In some implementations, a header used to harvest two or more crop types simultaneously may generate separate material streams for each crop type. An image sensor, such as region sensor 206, collects image data that includes both material streams. An image analyzer, similar to image analyzer 224, analyzes the different material streams in the image data in a manner similar to that described above. In some instances, the different material streams are analyzed separately. In some instances, the image analyzer is also operable to detect the presence of a first crop material in the material flow associated with a different crop material. Target distribution data may include a criteria for altering a setting of the header based on a selected amount of material of the first crop type being present in the material flow for the second crop type and vice versa. Based on a type of material (e.g., EHP or MOG) of a crop type and where that material enters a material stream of a different crop type, a controller (such as controller 200) may control one or more actuators, such as one or more actuators 240, to reduce deposition of material of one crop type into a material stream of a different crop type. For example, where a first crop type is soybeans and where a second crop type is corn, a header operable to harvest both crop types simultaneously may experience, for example, corn ears being deposited in a material flow of the soybeans. Image data of this phenomenon are captured by an image sensor, such as a region sensor 206, and an image analyzer, such as image analyzer 224, analyzes the image data to determine where or how corn ears are being introduced into the material flow for the soybeans or vice versa. A corrective action is determined based on, for example, a comparison between measured distribution data and target distribution data. A corrective action may be actuation of one or more actuators that are particular to a portion of the header that handles one of the crop types.

Without in any way limiting the scope, interpretation, or application of the claims appearing below, a technical effect of one or more of the example implementations disclosed herein is to reduce grain losses and increase efficiency associated with harvesting. In some instances, the grain losses are avoided by proactively monitoring crop material behavior relative to a header and making adjustment to the header in order to avoid grain losses.

Figure 17:
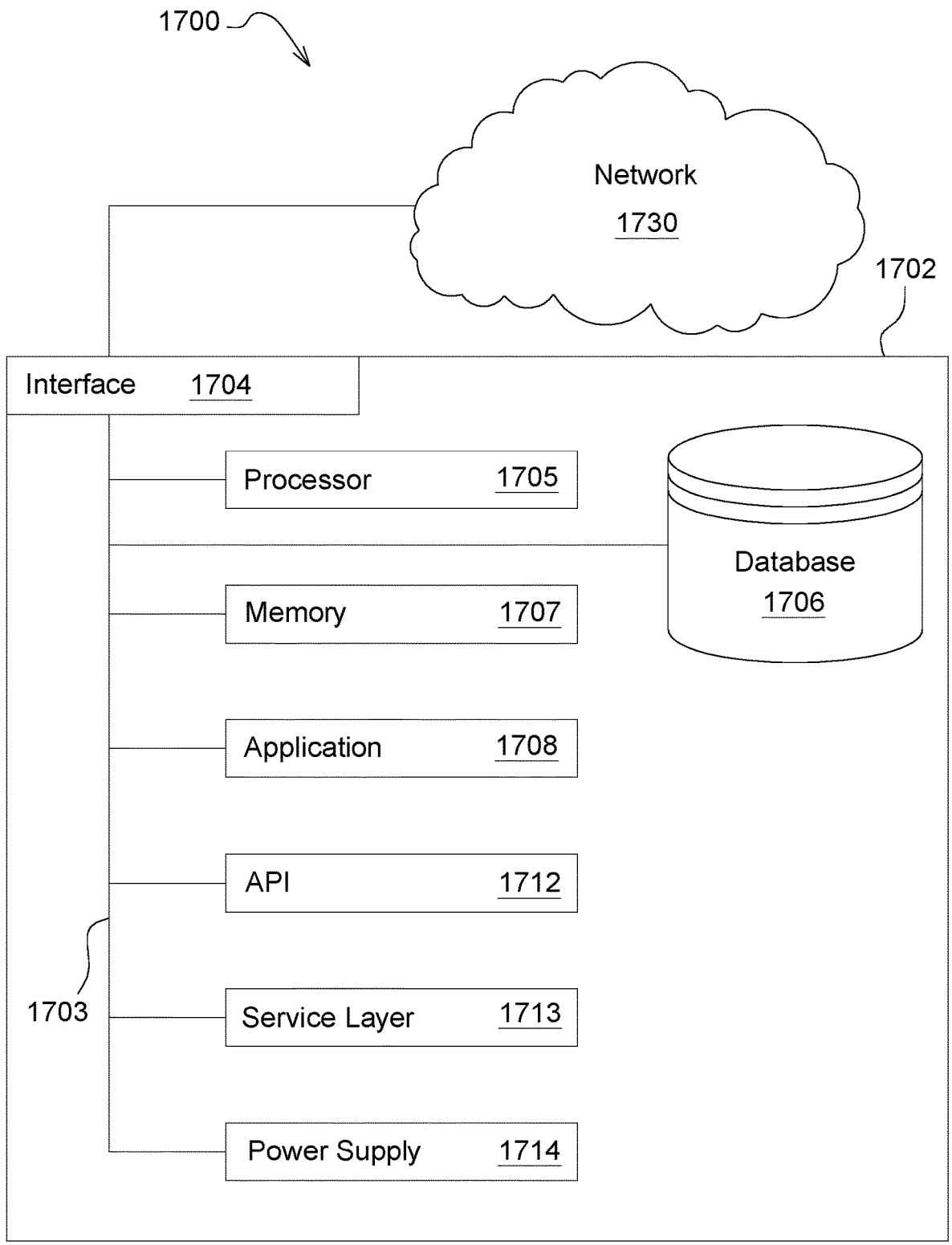
FIG. 17 is a block diagram illustrating an example computer system used to provide computational functionalities associated with described algorithms, methods, functions, processes, flows, and procedures as described in the present disclosure, according to some implementations of the present disclosure.

FIG. 17 is a block diagram of an example computer system 1700 used to provide computational functionalities associated with described algorithms, methods, functions, processes, flows, and procedures described in the present disclosure, according to some implementations of the present disclosure. The illustrated computer 1702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1702 can include input devices such as keypads, keyboards, and touch screens that can accept user information. Also, the computer 1702 can include output devices that can convey information associated with the operation of the computer 1702. The information can include digital data, visual data, audio information, or a combination of information. The information can be presented in a graphical user interface (UI) (or GUI).

The computer 1702 can serve in a role as a client, a network component, a server, a database, a persistency, or components of a computer system for performing the subject matter described in the present disclosure. The illustrated computer 1702 is communicably coupled with a network 1730. In some implementations, one or more components of the computer 1702 can be configured to operate within different environments, including cloud-computing-based environments, local environments, global environments, and combinations of environments.

At a high level, the computer 1702 is an electronic computing device operable to receive, transmit, process, store, and manage data and information associated with the described subject matter. According to some implementations, the computer 1702 can also include, or be communicably coupled with, an application server, an email server, a web server, a caching server, a streaming data server, or a combination of servers.

The computer 1702 can receive requests over network 1730 from a client application (for example, executing on another computer 1702). The computer 1702 can respond to the received requests by processing the received requests using software applications. Requests can also be sent to the computer 1702 from internal users (for example, from a command console), external (or third) parties, automated applications, entities, individuals, systems, and computers.

Each of the components of the computer 1702 can communicate using a system bus 1703. In some implementations, any or all of the components of the computer 1702, including hardware or software components, can interface with each other or the interface 1704 (or a combination of both), over the system bus 1703. Interfaces can use an application programming interface (API) 1712, a service layer 1713, or a combination of the API 1712 and service layer 1713. The API 1712 can include specifications for routines, data structures, and object classes. The API 1712 can be either computer-language independent or dependent. The API 1712 can refer to a complete interface, a single function, or a set of APIs.

The service layer 1713 can provide software services to the computer 1702 and other components (whether illustrated or not) that are communicably coupled to the computer 1702. The functionality of the computer 1702 can be accessible for all service consumers using this service layer. Software services, such as those provided by the service layer 1713, can provide reusable, defined functionalities through a defined interface. For example, the interface can be software written in JAVA, C++, or a language providing data in extensible markup language (XML) format. While illustrated as an integrated component of the computer 1702, in alternative implementations, the API 1712 or the service layer 1713 can be stand-alone components in relation to other components of the computer 1702 and other components communicably coupled to the computer 1702. Moreover, any or all parts of the API 1712 or the service layer 1713 can be implemented as child or sub-modules of another software module, enterprise application, or hardware module without departing from the scope of the present disclosure.

The computer 1702 includes an interface 1704. Although illustrated as a single interface 1704 in FIG. 17, two or more interfaces 1704 can be used according to particular needs, desires, or particular implementations of the computer 1702 and the described functionality. The interface 1704 can be used by the computer 1702 for communicating with other systems that are connected to the network 1730 (whether illustrated or not) in a distributed environment. Generally, the interface 1704 can include, or be implemented using, logic encoded in software or hardware (or a combination of software and hardware) operable to communicate with the network 1730. More specifically, the interface 1704 can include software supporting one or more communication protocols associated with communications. As such, the network 1730 or the interface's hardware can be operable to communicate physical signals within and outside of the illustrated computer 1702.

The computer 1702 includes a processor 1705. Although illustrated as a single processor 1705 in FIG. 17, two or more processors 1705 can be used according to particular needs, desires, or particular implementations of the computer 1702 and the described functionality. Generally, the processor 1705 can execute instructions and can manipulate data to perform the operations of the computer 1702, including operations using algorithms, methods, functions, processes, flows, and procedures as described in the present disclosure.

The computer 1702 also includes a database 1706 that can hold data for the computer 1702 and other components connected to the network 1730 (whether illustrated or not). For example, database 1706 can be an in-memory, conventional, or a database storing data consistent with the present disclosure. In some implementations, database 1706 can be a combination of two or more different database types (for example, hybrid in-memory and conventional databases) according to particular needs, desires, or particular implementations of the computer 1702 and the described functionality. Although illustrated as a single database 1706 in FIG. 17, two or more databases (of the same, different, or combination of types) can be used according to particular needs, desires, or particular implementations of the computer 1702 and the described functionality. While database 1706 is illustrated as an internal component of the computer 1702, in alternative implementations, database 1706 can be external to the computer 1702.

The computer 1702 also includes a memory 1707 that can hold data for the computer 1702 or a combination of components connected to the network 1730 (whether illustrated or not). Memory 1707 can store any data consistent with the present disclosure. In some implementations, memory 1707 can be a combination of two or more different types of memory (for example, a combination of semiconductor and magnetic storage) according to particular needs, desires, or particular implementations of the computer 1702 and the described functionality. Although illustrated as a single memory 1707 in FIG. 17, two or more memories 1707 (of the same, different, or combination of types) can be used according to particular needs, desires, or particular implementations of the computer 1702 and the described functionality. While memory 1707 is illustrated as an internal component of the computer 1702, in alternative implementations, memory 1707 can be external to the computer 1702.

The application 1708 can be an algorithmic software engine providing functionality according to particular needs, desires, or particular implementations of the computer 1702 and the described functionality. For example, application 1708 can serve as one or more components, modules, or applications. Further, although illustrated as a single application 1708, the application 1708 can be implemented as multiple applications 1708 on the computer 1702. In addition, although illustrated as internal to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion and management circuits, including recharging, standby, and power management functionalities. In some implementations, the power-supply 1714 can include a power plug to allow the computer 1702 to be plugged into a wall socket or a power source to, for example, power the computer 1702 or recharge a rechargeable battery.

There can be any number of computers 1702 associated with, or external to, a computer system containing computer 1702, with each computer 1702 communicating over network 1730. Further, the terms "client," "user," and other appropriate terminology can be used interchangeably, as appropriate, without departing from the scope of the present disclosure. Moreover, the present disclosure contemplates that many users can use one computer 1702 and one user can use multiple computers 1702.

Described implementations of the subject matter can include one or more features, alone or in combination.

For example, in a first implementation, a computer-implemented method includes: analyzing a plurality of images containing at least a portion of the agricultural header to detect crop material present in the images; categorizing the detected crop material detected in the plurality of images; generating measured distribution data based on the categorized crop material; comparing the measured distribution data with target distribution data; and adjusting a setting of the agricultural header when the measured distribution data does not satisfy the target distribution data.

The foregoing and other described implementations can each, optionally, include one or more of the following features:

A first feature, combinable with any of the following features, the method further including generating a plurality of images of an area of a harvester header during a harvesting operation.

A second feature, combinable with any of the previous or following features, wherein generating a plurality of images of an area of a harvester header during a harvesting operation includes capturing the plurality of images with an image sensor.

A third feature, combinable with any of the previous or following features, wherein analyzing a plurality of images containing at least a portion of the agricultural header to detect crop material present in the images includes detecting a type of crop material present in the images.

A fourth feature, combinable with any of the previous or following features, wherein detecting a type of crop material present in the images includes detecting at least one of a crop grain component of a crop ("CGC") being harvested or a material other than grain ("MOG") of the crop being harvested.

A fifth feature, combinable with any of the previous or following features, wherein analyzing the plurality of images containing at least a portion of the agricultural header to detect crop material present in the images includes detecting a behavior of the crop material in the plurality of images.

A sixth feature, combinable with any of the previous or following features, wherein detecting a behavior of the crop material in the images includes determining a trajectory of the detected crop material relative to the agricultural header.

A seventh feature, combinable with any of the previous or following features, wherein determining a trajectory of the detected crop material relative to the agricultural header includes determining a vector of the crop material relative to the agricultural header.

An eighth feature, combinable with any of the previous or following features, wherein determining a vector of the crop material relative to the agricultural header includes: identifying a centroid of the crop material; identifying a boundary of the harvester header; generating a line from the centroid to a location along the boundary; and detecting how the position of the centroid changes over time relative to the location along the boundary of the agricultural header based on how a length and position of the line relative to the location.

A ninth feature, combinable with any of the previous or following features, wherein detecting a behavior of the crop material in the images includes determining a rotation of the crop material.

A tenth feature, combinable with any of the previous or following features, wherein determining a rotation of the crop material includes identifying a major axis of the crop material and detecting a change in length or orientation of the major axis from one image to the next to define rotation of the crop material.

An eleventh feature, combinable with any of the previous or following features, wherein analyzing the plurality of images containing at least a portion of the agricultural header to detect crop material present in the images includes predicting whether the trajectory represents a loss of the crop material from the header and wherein comparing the measured distribution data with target distribution data includes determining whether the loss based on the trajectory exceeds a threshold defined in the target distribution data.

A twelfth feature, combinable with any of the previous or following features, wherein the measured distribution data includes the detected behavior of the crop material and wherein comparing the measured distribution data with target distribution data includes determining whether the detected behavior of the crop material varies from a condition defined in the target distribution data by a selected amount.

A thirteenth feature, combinable with any of the previous or following features, wherein adjusting a setting of the agricultural header when the measured distribution data does not satisfy the target distribution data includes adjusting a setting of the agricultural header when the detected behavior of the crop material varies from the condition defined in the target distribution data by the selected amount.

A fourteenth feature, combinable with any of the previous features, wherein analyzing a plurality of images containing at least a portion of the agricultural header to detect crop material present in the images includes detecting the crop material based on a contrast between a first color associated with the crop material and a second color associated with a surrounding of the crop material.

In a second implementation, a non-transitory, computer-readable medium storing one or more instructions executable by a computer system to perform operations including: analyzing a plurality of images containing at least a portion of the agricultural header to detect crop material present in the images; categorizing the detected crop material detected in the plurality of images; generating measured distribution data based on the categorized crop material; comparing the measured distribution data with target distribution data; and adjusting a setting of the agricultural header when the measured distribution data does not satisfy the target distribution data.

The foregoing and other described implementations can each, optionally, include one or more of the following features:

A first feature, combinable with any of the following features, further including one or more instructions executable by a computer system to perform generating a plurality of images of an area of a harvester header during a harvesting operation.

A second feature, combinable with any of the previous or following features, wherein generating a plurality of images of an area of a harvester header during a harvesting operation includes capturing the plurality of images with an image sensor.

A third feature, combinable with any of the previous or following features, wherein analyzing a plurality of images containing at least a portion of the agricultural header to detect crop material present in the images includes detecting a type of crop material present in the images.

A fourth feature, combinable with any of the previous or following features, wherein detecting a type of crop material present in the images includes detecting at least one of a crop grain component of a crop ("CGC") being harvested or a material other than grain ("MOG") of the crop being harvested.

A fifth feature, combinable with any of the previous or following features, wherein analyzing the plurality of images containing at least a portion of the agricultural header to detect crop material present in the images includes detecting a behavior of the crop material in the plurality of images.

A sixth feature, combinable with any of the previous or following features, wherein detecting a behavior of the crop material in the images includes determining a trajectory of the detected crop material relative to the agricultural header.

A seventh feature, combinable with any of the previous or following features, wherein determining a trajectory of the detected crop material relative to the agricultural header includes determining a vector of the crop material relative to the agricultural header.

An eighth feature, combinable with any of the previous or following features, wherein determining a vector of the crop material relative to the agricultural header includes: identifying a centroid of the crop material; identifying a boundary of the harvester header; generating a line from the centroid to a location along the boundary; and detecting how the position of the centroid changes over time relative to the location along the boundary of the agricultural header based on how a length and position of the line relative to the location.

A ninth feature, combinable with any of the previous or following features, wherein detecting a behavior of the crop material in the images includes determining a rotation of the crop material.

A tenth feature, combinable with any of the previous or following features, wherein determining a rotation of the crop material includes identifying a major axis of the crop material and detecting a change in length or orientation of the major axis from one image to the next to define rotation of the crop material.

An eleventh feature, combinable with any of the previous or following features, wherein analyzing the plurality of images containing at least a portion of the agricultural header to detect crop material present in the images includes predicting whether the trajectory represents a loss of the crop material from the header and wherein comparing the measured distribution data with target distribution data includes determining whether the loss based on the trajectory exceeds a threshold defined in the target distribution data.

A twelfth feature, combinable with any of the previous or following features, wherein the measured distribution data includes the detected behavior of the crop material and wherein comparing the measured distribution data with target distribution data includes determining whether the detected behavior of the crop material varies from a condition defined in the target distribution data by a selected amount.

A thirteenth feature, combinable with any of the previous or following features, wherein adjusting a setting of the agricultural header when the measured distribution data does not satisfy the target distribution data includes adjusting a setting of the agricultural header when the detected behavior of the crop material varies from the condition defined in the target distribution data by the selected amount.

A fourteenth feature, combinable with any of the previous features, wherein analyzing a plurality of images containing at least a portion of the agricultural header to detect crop material present in the images includes detecting the crop material based on a contrast between a first color associated with the crop material and a second color associated with a surrounding of the crop material.

In a third implementation, a computer-implemented system, comprising one or more processors and a non-transitory computer-readable storage medium coupled to the one or more processors and storing programming instructions for execution by the one or more processors, the programming instructions instructing the one or more processors to: analyze a plurality of images containing at least a portion of the agricultural header to detect crop material present in the images; categorize the detected crop material detected in the plurality of images; generate measured distribution data based on the categorized crop material; compare the measured distribution data with target distribution data; and adjust a setting of the agricultural header when the measured distribution data does not satisfy the target distribution data.

The foregoing and other described implementations can each, optionally, include one or more of the following features:

A first feature, combinable with any of the following features, wherein the programming instructions include programming instruction instructing the one or more processors to generate a plurality of images of an area of a harvester header during a harvesting operation.

A second feature, combinable with any of the previous or following features, wherein the programming instructions instructing the one or more processors to generate a plurality of images of an area of a harvester header during a harvesting operation include programming instruction instructing the one or more processors to capture the plurality of images with an image sensor.

A third feature, combinable with any of the previous or following features, wherein the programming instructions instructing the one or more processors to analyze a plurality of images containing at least a portion of the agricultural header to detect crop material present in the images include instructing the one or more processors to detect a type of crop material present in the images.

A fourth feature, combinable with any of the previous or following features, wherein the programming instructions instructing the one or more processors to detect a type of crop material present in the images include the programming instructions instructing the one or more processors to detect at least one of a crop grain component of a crop ("CGC") being harvested or a material other than grain ("MOG") of the crop being harvested.

A fifth feature, combinable with any of the previous or following features, wherein the programming instructions instructing the one or more processors to analyze the plurality of images containing at least a portion of the agricultural header to detect crop material present in the images include wherein the programming instructions instructing the one or more processors to detect a behavior of the crop material in the plurality of images.

A sixth feature, combinable with any of the previous or following features, wherein the programming instructions instructing the one or more processors to detect a behavior of the crop material in the images includes programming instructions instructing the one or more processors to determine a trajectory of the detected crop material relative to the agricultural header.

A seventh feature, combinable with any of the previous or following features, wherein the programming instructions instructing the one or more processors to determine a trajectory of the detected crop material relative to the agricultural header includes programming instructions instructing the one or more processors to determine a vector of the crop material relative to the agricultural header.

An eighth feature, combinable with any of the previous or following features, wherein the programming instructions instructing the one or more processors to determine a vector of the crop material relative to the agricultural header includes programming instructions instructing the one or more processors to: identify a centroid of the crop material; identifying a boundary of the harvester header; generate a line from the centroid to a location along the boundary; and detect how the position of the centroid changes over time relative to the location along the boundary of the agricultural header based on how a length and position of the line relative to the location.

A ninth feature, combinable with any of the previous or following features, wherein the programming instructions instructing the one or more processors to detect a behavior of the crop material in the images includes programming instructions instructing the one or more processors to determine a rotation of the crop material.

A tenth feature, combinable with any of the previous or following features, wherein the programming instructions instructing the one or more processors to determine a rotation of the crop material includes programming instructions instructing the one or more processors to identify a major axis of the crop material and detect a change in length or orientation of the major axis from one image to the next to define rotation of the crop material.

An eleventh feature, combinable with any of the previous or following features, wherein the programming instructions instructing the one or more processors to analyze the plurality of images containing at least a portion of the agricultural header to detect crop material present in the images includes programming instructions instructing the one or more processors to predict whether the trajectory represents a loss of the crop material from the header and wherein the programming instructions instructing the one or more processors to compare the measured distribution data with target distribution data includes programming instructions instructing the one or more processors to determine whether the loss based on the trajectory exceeds a threshold defined in the target distribution data.

A twelfth feature, combinable with any of the previous or following features, wherein the measured distribution data includes the detected behavior of the crop material and wherein the programming instructions instructing the one or more processors to compare the measured distribution data with target distribution data includes programming instructions instructing the one or more processors to determine whether the detected behavior of the crop material varies from a condition defined in the target distribution data by a selected amount.

A thirteenth feature, combinable with any of the previous or following features, wherein the programming instructions instructing the one or more processors to adjust a setting of the agricultural header when the measured distribution data does not satisfy the target distribution data includes programming instructions instructing the one or more processors to adjust a setting of the agricultural header when the detected behavior of the crop material varies from the condition defined in the target distribution data by the selected amount.

A fourteenth feature, combinable with any of the previous features, wherein the programming instructions instructing the one or more processors to analyze a plurality of images containing at least a portion of the agricultural header to detect crop material present in the images includes programming instructions instructing the one or more processors to detect the crop material based on a contrast between a first color associated with the crop material and a second color associated with a surrounding of the crop material.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, nontransitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific-integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or MS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, subprograms, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magnetooptical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read-only-memory (ROM), phase change memory (PRAM), static random access memory (SRAM), dynamic random access memory (DRAM), erasable programmable read-only memory (EPROM), electrically erasable programmable read-only memory (EE-PROM), and flash memory devices. Computer readable media can also include, for example, magnetic devices such as tape, cartridges, cassettes, and internal/removable disks. Computer readable-media can also include magneto-optical disks and optical memory devices and technologies including, for example, digital video disc (DVD), CD-ROM, DVD+/-R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A computer-implemented method performed by one or more processors for controlling an agricultural header based on movement of at least one crop grain component relative to the agricultural header during harvesting, the method comprising:
   analyzing one or more images containing at least a portion of the agricultural header to detect at least one crop grain component detached from a crop plant present in the one or more images, wherein said portion of the agricultural header includes at least one static location and said analyzing includes detecting movement of said crop grain component relative to said static location; and
   categorizing the detected crop grain component detected in the one or more images; and
   generating measured distribution data based on the categorized crop grain component; and
   adjusting a setting of the agricultural header using the measured distribution data.

2. The computer-implemented method of claim 1, further comprising comparing the measured distribution data with target distribution data.

3. The computer implemented method of claim 2, wherein adjusting a setting of the agricultural header using the measured distribution data comprises adjusting the setting of the agricultural header when the measured distribution data does not satisfy the target distribution data.

4. The computer-implemented method of claim 1, further comprising:
   generating the one or more images of the at least a portion of the agricultural header during a harvesting operation.

5. The computer-implemented method of claim 4, wherein generating the one or more images of an area of an agricultural header during a harvesting operation comprises capturing the one or more images with an image sensor.

6. The computer-implemented method of claim 1, wherein analyzing one or more images containing at least a portion of the agricultural header to detect at least one crop grain component present in the one or more images comprises detecting a type of crop grain component present in the one or more images.

7. The computer-implemented method of claim 6, wherein detecting a type of crop grain component present in the one or more images comprises detecting a plurality of crop grain components ("CGC") of a crop being harvested, wherein said plurality of CGC includes at least two distinguishable types of CGC, and wherein the at least two distinguishable types of CGC are selected from the group consisting of ears, heads, pods, partial ears, partial heads, partial pods, and individual grains, and wherein said computer-implemented method includes distinguishing between said at least two distinguishable types of CGC.

8. The computer-implemented method of claim 6, wherein the measured distribution data comprise the detected behavior of the crop grain component and further comprising determining whether the detected behavior of the crop grain component varies from a selected condition by a selected amount.

9. The computer-implemented method of claim 8, wherein adjusting a setting of the agricultural header using the measured distribution data comprises adjusting a setting of the agricultural header when the detected behavior of the crop grain component varies from the selected condition by the selected amount.

10. The computer-implemented method of claim 1, wherein analyzing the one or more images containing at least a portion of the agricultural header to detect at least one crop grain component present in the one or more images comprises detecting a behavior of the crop grain component in the one or more images.

11. The computer-implemented method of claim 10, wherein detecting a behavior of the crop grain component in the one or more images comprises determining a trajectory of the detected crop grain component relative to the static location of the agricultural header.

12. The computer-implemented method of claim 11, wherein determining a trajectory of the detected crop grain component relative to the static location comprises determining a vector of the crop grain component relative to the static location of the agricultural header.

13. The computer-implemented method of claim 12, wherein determining a vector of the crop grain component relative to the agricultural header comprises:
   identifying a feature of the crop grain component, wherein said feature is selected from the group consisting of a centroid, center of mass, major axis, minor axis, or a reference mark;
   identifying said static location of the agricultural header;
   generating a vector line from the feature to said static location; and
   detecting how the position of the feature changes over time relative to the static location of the agricultural header based on how a length and position of the vector line changes relative to the static location.

14. The computer-implemented method of claim 11, wherein analyzing the one or more images containing at least a portion of the agricultural header to detect at least one crop grain component present in the one or more images comprises predicting whether the trajectory represents a loss of the crop grain component from the agricultural header, and further comprising determining whether the loss based on the trajectory exceeds a threshold.

15. The computer-implemented method of claim 10, wherein detecting a behavior of the crop grain component in the one or more images comprises determining a rotation of at least one crop grain component ("CGC"), wherein said at least one CGC is selected from the group consisting of ears, heads, pods, partial ears, partial heads, partial pods, individual grains, and combinations thereof.

16. The computer-implemented method of claim 1, further comprising displaying at least a portion of the measured distribution data.

17. The computer-implemented method of claim 1, wherein analyzing one or more images containing at least a portion of the agricultural header to detect at least one crop grain component present in the one or more images comprises detecting the crop grain component based on a contrast between a first color associated with the crop grain component and a second color associated with a surrounding of the crop grain component.

18. An apparatus for controlling an agricultural header based on movement of at least one crop grain component at the agricultural header during harvesting, the apparatus comprising:
one or more processors; and
a non-transitory computer-readable storage medium coupled to the one or more processors and storing programming instructions for execution by the one or more processors, the programming instructions instruct the one or more processors to:
analyze one or more images containing at least a portion of the agricultural header to detect at least one crop grain component detached from a crop plant present in the one or more images, wherein said portion of the agricultural header includes at least one static location and the analysis includes detecting movement of said at least one crop grain component relative to said static location;
categorize the detected crop grain component detected in the one or more images;
generate measured distribution data based on the categorized crop material;
compare the measured distribution data with target distribution data; and
adjust a setting of the agricultural header when the measured distribution data does not satisfy the target distribution data.

19. The apparatus of claim 18, further comprising programming instructions to instruct the one or more processors to generate the one or more images of the at least a portion of the agricultural header during a harvesting operation.

20. The apparatus of claim 19, wherein the programming instructions operable to instruct the one or more processors to generate the one or more images of an area of the agricultural header during a harvesting operation comprise programming instructions operable to instruct the one or more processors to capture the one or more images with an image sensor.

21. The apparatus of claim 18, wherein the programming instructions operable to instruct the one or more processors to analyze the one or more images containing at least a portion of the agricultural header to detect at least one crop grain component present in the one or more images comprise programming instructions operable to instruct the one or more processors to detect a behavior of the crop grain component in the one or more images.

22. The apparatus of claim 18, wherein the programming instructions operable to instruct the one or more processors to adjust a setting of the agricultural header when the measured distribution data does not satisfy the target distribution data comprise programming instructions operable to instruct the one or more processors to adjust a setting of the agricultural header when a detected behavior of the at least one crop grain component varies from the condition defined in the target distribution data by the selected amount.

* * * * *